(12) United States Patent
Sakuyama

(10) Patent No.: US 7,865,028 B2
(45) Date of Patent: Jan. 4, 2011

(54) CODE PROCESSING APPARATUS AND CODE PROCESSING METHOD

(75) Inventor: Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 942 days.

(21) Appl. No.: 11/784,269

(22) Filed: Apr. 6, 2007

(65) Prior Publication Data

US 2007/0242889 A1 Oct. 18, 2007

(30) Foreign Application Priority Data

Apr. 12, 2006 (JP) .............................. 2006-109746

(51) Int. Cl.
*G06K 9/36* (2006.01)
*G06K 9/46* (2006.01)

(52) U.S. Cl. ...................................... 382/240; 382/232

(58) Field of Classification Search ................. 382/232, 382/240, 248, 250, 282
See application file for complete search history.

(56) References Cited

U.S. PATENT DOCUMENTS

| | | | | |
|---|---|---|---|---|
| 6,483,946 | B1 * | 11/2002 | Martucci et al. | 382/240 |
| 6,898,325 | B2 * | 5/2005 | Gormish | 382/248 |
| 7,110,608 | B2 * | 9/2006 | Chan et al. | 382/239 |
| 7,127,117 | B2 | 10/2006 | Sano | |
| 7,158,679 | B2 | 1/2007 | Sano | |
| 7,200,272 | B2 * | 4/2007 | Ishikawa | 382/233 |
| 7,206,804 | B1 * | 4/2007 | Deshpande et al. | 709/203 |
| 7,298,909 | B2 * | 11/2007 | Ishikawa | 382/232 |
| 7,302,104 | B2 * | 11/2007 | Suino | 382/240 |
| 7,447,369 | B2 * | 11/2008 | Gormish et al. | 382/235 |
| 7,460,724 | B2 * | 12/2008 | Gormish | 382/240 |
| 7,477,792 | B2 * | 1/2009 | Wu et al. | 382/240 |
| 7,580,577 | B2 * | 8/2009 | Enokida et al. | 382/232 |

(Continued)

FOREIGN PATENT DOCUMENTS

| | | |
|---|---|---|
| JP | 11-205786 | 7/1999 |
| JP | 2003-023630 | 1/2003 |

OTHER PUBLICATIONS

Robert H. Deng, Di Ma, Weizhong Shao and Yongdong Wu "Scalable trusted online dissemination of JPEG2000 images" Multimedia Systems, Springer, ISSN 0942-4962, vol. 11, No. 1, Nov. 2005 pp. 60-67 SpringerLink Date Saturday, Jul. 23, 2005.*

(Continued)

Primary Examiner—Samir A Ahmed
Assistant Examiner—Li Liu
(74) Attorney, Agent, or Firm—Blakely, Sokoloff, Taylor & Zafman LLP

(57) ABSTRACT

A code processing apparatus for generating a file including a JPEG 2000 codestream or a JPEG 2000 family format including the JPEG 2000 codestream is disclosed that includes a packet arranging part for arranging the order of a plurality of packets included in the JPEG 2000 codestream according to an extended progression order selected from a group of extended progression orders including "xTxxx", "xxTxx", "xxxTx", and "xxxxT". Each "x" in the extended progression orders represents one of a resolution level characteristic, a layer characteristic, a component characteristic, and a precinct characteristic. The leftmost "x" of each extended progression order corresponds to an outermost characteristic of the extended progression order. "T" represents a tile characteristic.

8 Claims, 34 Drawing Sheets

| VALUE | EXTENDED PROGRESSION ORDER |
|---|---|
| 0000_0000 | TLRCP |
| 0000_0001 | TRLCP |
| 0000_0010 | TRPCL |
| 0000_0011 | TPCRL |
| 0000_0100 | TCPRL |
| 0000_0101 | LTRCP |
| 0000_0110 | RTLCP |
| 0000_0111 | RTPCL |
| 0000_1000 | PTCRL |
| 0000_1001 | CTPRL |
| 0000_1010 | LRTCP |
| 0000_1011 | RLTCP |
| 0000_1100 | RPTCL |
| 0000_1101 | PCTRL |
| 0000_1110 | CPTRL |
| 0000_1111 | LRCTP |
| 0001_0000 | RLCTP |
| 0001_0001 | RPCTL |
| 0001_0010 | PCRTL |
| 0001_0011 | CPRTL |
| 0001_0100 | LRCPT |
| 0001_0101 | RLCPT |
| 0001_0110 | RPCLT |
| 0001_0111 | PCRLT |
| 0001_1000 | CPRLT |

U.S. PATENT DOCUMENTS

| | | |
|---|---|---|
| 7,581,027 B2 * | 8/2009 | Boliek et al. ............... 709/247 |
| 7,643,700 B2 * | 1/2010 | Kodama ..................... 382/282 |
| 7,650,037 B2 * | 1/2010 | Clare et al. ................. 382/232 |
| 2003/0228061 A1 | 12/2003 | Sakuyama |
| 2004/0013310 A1 | 1/2004 | Suino et al. |
| 2004/0095477 A1 | 5/2004 | Maki |
| 2004/0100654 A1 | 5/2004 | Kodama |
| 2004/0109610 A1 | 6/2004 | Kodama et al. |
| 2004/0126019 A1 | 7/2004 | Ikebe |
| 2004/0126020 A1 | 7/2004 | Sakuyama |
| 2004/0126029 A1 | 7/2004 | Sakuyama |
| 2004/0130570 A1 | 7/2004 | Sakuyama |
| 2004/0131264 A1 | 7/2004 | Sakuyama |
| 2004/0134978 A1 | 7/2004 | Hara |
| 2004/0136595 A1 | 7/2004 | Sakuyama |
| 2004/0141651 A1 | 7/2004 | Hara |
| 2004/0146160 A1 | 7/2004 | Nomizu |
| 2004/0151386 A1 | 8/2004 | Kodama |
| 2004/0151387 A1 | 8/2004 | Sakuyama |
| 2004/0156548 A1 | 8/2004 | Kodama |
| 2004/0190782 A1 | 9/2004 | Nomizu |
| 2004/0201593 A1 | 10/2004 | Miyazawa et al. |
| 2004/0202371 A1 | 10/2004 | Kodama |
| 2004/0202372 A1 | 10/2004 | Sakuyama |
| 2004/0208379 A1 | 10/2004 | Kodama |
| 2004/0208380 A1 | 10/2004 | Aoki |
| 2004/0212843 A1 | 10/2004 | Kodama |
| 2004/0217887 A1 | 11/2004 | Nomizu |
| 2004/0218817 A1 | 11/2004 | Kodama |
| 2004/0228534 A1 | 11/2004 | Sakuyama |
| 2004/0252834 A1 | 12/2004 | Nishimura |
| 2004/0252897 A1 | 12/2004 | Hara |
| 2004/0264785 A1 | 12/2004 | Suino |
| 2005/0015247 A1 | 1/2005 | Sakuyama |
| 2005/0031215 A1 | 2/2005 | Nomizu |
| 2005/0036695 A1 | 2/2005 | Yano |
| 2005/0036701 A1 | 2/2005 | Miyazawa et al. |
| 2005/0053239 A1 | 3/2005 | Nomizu |
| 2005/0111740 A1 | 5/2005 | Sakuyama |
| 2006/0152391 A1 | 7/2006 | Sakuyama |
| 2006/0245655 A1 | 11/2006 | Suino |
| 2006/0269151 A1 | 11/2006 | Sakuyama |

OTHER PUBLICATIONS

Marcellin, M.W.; Gormish, M.J.; Bilgin, A.; Boliek, M.P., "An overview of JPEG-2000" Proceedings of Data Compression Conference, DCC 2000, pp. 523-541.*

* cited by examiner

FIG.3

| 3LL RESOLUTION LEVEL 0 | 3HL RESOLUTION LEVEL 1 | 2HL RESOLUTION LEVEL 2 | 1HL RESOLUTION LEVEL 3 |
|---|---|---|---|
| 3LH RESOLUTION LEVEL 1 | 3HH RESOLUTION LEVEL 1 | | |
| 2LH RESOLUTION LEVEL 2 | | 2HH RESOLUTION LEVEL 2 | |
| 1LH RESOLUTION LEVEL 3 | | | 1HH RESOLUTION LEVEL 3 |

FIG.5

| | |
|---|---|
| LAYER >> RESOLUTION >> COMPONENT >> POSITION | LRCP |
| RESOLUTION >> LAYER >> COMPONENT >> POSITION | RLCP |
| RESOLUTION >> POSITION >> COMPONENT >> LAYER | RPCL |
| POSITION >> COMPONENT >> RESOLUTION >> LAYER | PCRL |
| COMPONENT >> POSITION >> RESOLUTION >> LAYER | CPRL |

FIG.7

| LRCP PACKET 0 | PACKET 1 | PACKET 2 | PACKET 3 | PACKET 4 | PACKET 5 |
|---|---|---|---|---|---|
| LAYER 0 | LAYER 0 | LAYER 0 | LAYER 0 | LAYER 0 | LAYER 0 |
| RESOLUTION 0 | RESOLUTION 0 | RESOLUTION 0 | RESOLUTION 1 | RESOLUTION 1 | RESOLUTION 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| LAYER 0 | LAYER 0 | LAYER 0 | LAYER 0 | LAYER 0 | LAYER 0 |
| RESOLUTION 2 | RESOLUTION 2 | RESOLUTION 2 | RESOLUTION 2 | RESOLUTION 2 | RESOLUTION 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 12 | PACKET 13 | PACKET 14 | PACKET 15 | PACKET 16 | PACKET 17 |
|---|---|---|---|---|---|
| LAYER 0 | LAYER 0 | LAYER 0 | LAYER 0 | LAYER 0 | LAYER 0 |
| RESOLUTION 2 | RESOLUTION 2 | RESOLUTION 2 | RESOLUTION 2 | RESOLUTION 2 | RESOLUTION 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 18 | PACKET 19 | PACKET 20 | PACKET 21 | PACKET 22 | PACKET 23 |
|---|---|---|---|---|---|
| LAYER 1 | LAYER 1 | LAYER 1 | LAYER 1 | LAYER 1 | LAYER 1 |
| RESOLUTION 0 | RESOLUTION 0 | RESOLUTION 0 | RESOLUTION 1 | RESOLUTION 1 | RESOLUTION 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 24 | PACKET 25 | PACKET 26 | PACKET 27 | PACKET 28 | PACKET 29 |
|---|---|---|---|---|---|
| LAYER 1 | LAYER 1 | LAYER 1 | LAYER 1 | LAYER 1 | LAYER 1 |
| RESOLUTION 2 | RESOLUTION 2 | RESOLUTION 2 | RESOLUTION 2 | RESOLUTION 2 | RESOLUTION 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| LAYER 1 | LAYER 1 | LAYER 1 | LAYER 1 | LAYER 1 | LAYER 1 |
| RESOLUTION 2 | RESOLUTION 2 | RESOLUTION 2 | RESOLUTION 2 | RESOLUTION 2 | RESOLUTION 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

FIG.9

| RLCP PACKET 0 | PACKET 1 | PACKET 2 | PACKET 3 | PACKET 4 | PACKET 5 |
|---|---|---|---|---|---|
| RESOLUTION 0 | RESOLUTION 0 | RESOLUTION 0 | RESOLUTION 0 | RESOLUTION 0 | RESOLUTION 0 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| RESOLUTION 1 | RESOLUTION 1 | RESOLUTION 1 | RESOLUTION 1 | RESOLUTION 1 | RESOLUTION 1 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 12 | PACKET 13 | PACKET 14 | PACKET 15 | PACKET 16 | PACKET 17 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 18 | PACKET 19 | PACKET 20 | PACKET 21 | PACKET 22 | PACKET 23 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 24 | PACKET 25 | PACKET 26 | PACKET 27 | PACKET 28 | PACKET 29 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

FIG.10

| SOT | Lsot | Isot | Psot | TPsot | TNsot |
|---|---|---|---|---|---|

FIG.11

| Parameter | Size(bits) | Values | |
|---|---|---|---|
| SOT | 16 | 0xff90 | |
| Lsot | 16 | 10 | SIZE OF MARKER SEGMENT |
| Isot | 16 | 0~65534 | TILE NUMBER STARTING FROM 0 NUMBER ASSIGNED ACCORDING TO RASTER ORDER |
| Psot | 32 | 12~(2**32-1) | LENGTH OF TILE PART EOC ENDS WHEN 0 IS DESIGNATED |
| TPsot | 8 | 0~254 | TILE PART NUMBER ORDER NUMBER REFERRED WHEN REPRODUCING IN AN ORDER DIFFERENT FROM USUAL ORDER BY DECODER |
| TNsot | 8 | 0~255 | TILE PART NUMBER INDICATE PRECISE TILE PART NUMBER OR 0 NUMBER OF TILE PARTS NOT COMPLYING TO DEFINITION IN TILE PART DEFINED IN A CASE OF 0 |

| Parameter | Size(bits) | Values | |
|---|---|---|---|
| TLM | 16 | 0xff55 | |
| Ltlm | 16 | 6~65535 | SIZE OF MARKER SEGMENT |
| Ztlm | 8 | 0~255 | IDENTIFICATION NUMBER OF TLM NUMBER |
| Stlm | 8 | TABLE 29 | LENGTH OF Ttlm AND Ptlm |
| Ttlm(i) | 0<br>8<br>16 | 0 (ST=0)<br>0~254 (ST=1)<br>0~65534 (ST=2) | TILE NUMBER FOR TILE PART i |
| Ptlm(i) | 16<br><br>32 | 13~65535<br>(SP=0)<br>13~ (2**32) -1<br>(SP=1) | LENGTH (BYTE NUMBER) FROM SOT MARKER FOR TILE PART i TO LAST TILE PART |

FIG.14

TILE PART 0

RLCP
| PACKET 0 | PACKET 1 | PACKET 2 | PACKET 3 | PACKET 4 | PACKET 5 |
|---|---|---|---|---|---|
| RESOLUTION 0 | RESOLUTION 0 | RESOLUTION 0 | RESOLUTION 0 | RESOLUTION 0 | RESOLUTION 0 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

TILE PART 1

| PACKET 6 | PACKET 7 | PACKET 8 | PACKET 9 | PACKET 10 | PACKET 11 |
|---|---|---|---|---|---|
| RESOLUTION 1 | RESOLUTION 1 | RESOLUTION 1 | RESOLUTION 1 | RESOLUTION 1 | RESOLUTION 1 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

TILE PART 2

| PACKET 12 | PACKET 13 | PACKET 14 | PACKET 15 | PACKET 16 | PACKET 17 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 18 | PACKET 19 | PACKET 20 | PACKET 21 | PACKET 22 | PACKET 23 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 24 | PACKET 25 | PACKET 26 | PACKET 27 | PACKET 28 | PACKET 29 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

FIG.15

| | TILE PART 0 | | | TILE PART 1 | | |
|---|---|---|---|---|---|---|
| RLCP | PACKET 0 | PACKET 1 | PACKET 2 | PACKET 3 | PACKET 4 | PACKET 5 |
| | RESOLUTION 0 | RESOLUTION 0 | RESOLUTION 0 | RESOLUTION 0 | RESOLUTION 0 | RESOLUTION 0 |
| | LAYER 0 | LAYER 0 | LAYER 0 | LAYER 1 | LAYER 1 | LAYER 1 |
| | COMPONENT 0 | COMPONENT 1 | COMPONENT 2 | COMPONENT 0 | COMPONENT 1 | COMPONENT 2 |
| | PRECINCT 0 | PRECINCT 0 | PRECINCT 0 | PRECINCT 0 | PRECINCT 0 | PRECINCT 0 |

| TILE PART 2 | | | TILE PART 3 | | |
|---|---|---|---|---|---|
| PACKET 6 | PACKET 7 | PACKET 8 | PACKET 9 | PACKET 10 | PACKET 11 |
| RESOLUTION 1 | RESOLUTION 1 | RESOLUTION 1 | RESOLUTION 1 | RESOLUTION 1 | RESOLUTION 1 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| TILE PART 4 | | | | | |
|---|---|---|---|---|---|
| PACKET 12 | PACKET 13 | PACKET 14 | PACKET 15 | PACKET 16 | PACKET 17 |
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 18 | PACKET 19 | PACKET 20 | PACKET 21 | PACKET 22 | PACKET 23 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| TILE PART 5 | | | | | |
|---|---|---|---|---|---|
| PACKET 24 | PACKET 25 | PACKET 26 | PACKET 27 | PACKET 28 | PACKET 29 |
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

FIG.16

RLCP

| | TILE PART 0 | TILE PART 1 | TILE PART 2 | TILE PART 3 | TILE PART 4 | TILE PART 5 |
|---|---|---|---|---|---|---|
| | PACKET 0 | PACKET 1 | PACKET 2 | PACKET 3 | PACKET 4 | PACKET 5 |
| | RESOLUTION 0 | RESOLUTION 0 | RESOLUTION 0 | RESOLUTION 0 | RESOLUTION 0 | RESOLUTION 0 |
| | LAYER 0 | LAYER 0 | LAYER 0 | LAYER 1 | LAYER 1 | LAYER 1 |
| | COMPONENT 0 | COMPONENT 1 | COMPONENT 2 | COMPONENT 0 | COMPONENT 1 | COMPONENT 2 |
| | PRECINCT 0 | PRECINCT 0 | PRECINCT 0 | PRECINCT 0 | PRECINCT 0 | PRECINCT 0 |

| TILE PART 6 | TILE PART 7 | TILE PART 8 | TILE PART 9 | TILE PART 10 | TILE PART 11 |
|---|---|---|---|---|---|
| PACKET 6 | PACKET 7 | PACKET 8 | PACKET 9 | PACKET 10 | PACKET 11 |
| RESOLUTION 1 | RESOLUTION 1 | RESOLUTION 1 | RESOLUTION 1 | RESOLUTION 1 | RESOLUTION 1 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| TILE PART 12 | | | | TILE PART 13 | |
|---|---|---|---|---|---|
| PACKET 12 | PACKET 13 | PACKET 14 | PACKET 15 | PACKET 16 | PACKET 17 |
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| TILE PART 14 | | | | | |
|---|---|---|---|---|---|
| PACKET 18 | PACKET 19 | PACKET 20 | PACKET 21 | PACKET 22 | PACKET 23 |
| RESOLUTION 2 | RESOLUTION 2 | RESOLUTION 2 | RESOLUTION 2 | RESOLUTION 2 | RESOLUTION 2 |
| LAYER 0 | LAYER 0 | LAYER 0 | LAYER 0 | LAYER 0 | LAYER 0 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| TILE PART 15 | | | | TILE PART 16 | |
|---|---|---|---|---|---|
| PACKET 24 | PACKET 25 | PACKET 26 | PACKET 27 | PACKET 28 | PACKET 29 |
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| TILE PART 17 | | | | | |
|---|---|---|---|---|---|
| PACKET 30 | PACKET 31 | PACKET 32 | PACKET 33 | PACKET 34 | PACKET 35 |
| RESOLUTION 2 | RESOLUTION 2 | RESOLUTION 2 | RESOLUTION 2 | RESOLUTION 2 | RESOLUTION 2 |
| LAYER 1 | LAYER 1 | LAYER 1 | LAYER 1 | LAYER 1 | LAYER 1 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

FIG.17

| COD | Lcod | Scod | SGcod | SPcod |
|---|---|---|---|---|

FIG.18

| Values | ORDER OF PROGRESSION |
|---|---|
| 0000_0000 | LAYER>>RESOLUTION>>COMPONENT>>POSITION |
| 0000_0001 | RESOLUTION>>LAYER>>COMPONENT>>POSITION |
| 0000_0010 | RESOLUTION>>POSITION>>COMPONENT>>LAYER |
| 0000_0011 | POSITION>>COMPONENT>>RESOLUTION>>LAYER |
| 0000_0100 | COMPONENT>>POSITION>>RESOLUTION>>LAYER |
| FOR OTHER PROGRESSION ORDERS | |

FIG.19

| COM | Lcom | Rcom | Ccom (i) | | Ccom (n) |
|---|---|---|---|---|---|

FIG.21

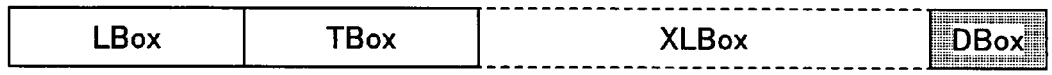

FIG.22

| Parameter | Size(bits) | Values | Content |
|---|---|---|---|
| LBox | 32 | 0, 1, 8~(2**32−1) | LENGTH OF Box<br>DEFINE LENGTH IN XL Box WHEN LBox = 1<br>LENGTH NOT DEFINED IN L Box WHEN LBox = 0<br>LBox = 0 WHEN Box IS INCLUDED IN Box DATA<br>VALUE 2-7 CANNOT BE USED |
| LBox | 32 | variable | Box TYPE<br>DATA TYPE OF DBox<br>NORMALLY INDICATED WITH ISO 646 TEXT BUT MAY BE INDICATED WITH HEXADECIMAL NUMERALS OF 4 BYTES |
| XLBox | 64 | 16~(2**64−1) : LBox='1'<br>0 | LENGTH OF box (EXTENDED INDICATION)<br>Box LENGTH INDICATED WITH 8 BYTES WHEN LBox = 1 |
| DBox | variable | variable | Box DATA (CONTENT) |

FIG.27

| VALUE | EXTENDED PROGRESSION ORDER |
|---|---|
| 0000_0000 | TLRCP |
| 0000_0001 | TRLCP |
| 0000_0010 | TRPCL |
| 0000_0011 | TPCRL |
| 0000_0100 | TCPRL |
| 0000_0101 | LTRCP |
| 0000_0110 | RTLCP |
| 0000_0111 | RTPCL |
| 0000_1000 | PTCRL |
| 0000_1001 | CTPRL |
| 0000_1010 | LRTCP |
| 0000_1011 | RLTCP |
| 0000_1100 | RPTCL |
| 0000_1101 | PCTRL |
| 0000_1110 | CPTRL |
| 0000_1111 | LRCTP |
| 0001_0000 | RLCTP |
| 0001_0001 | RPCTL |
| 0001_0010 | PCRTL |
| 0001_0011 | CPRTL |
| 0001_0100 | LRCPT |
| 0001_0101 | RLCPT |
| 0001_0110 | RPCLT |
| 0001_0111 | PCRLT |
| 0001_1000 | CPRLT |

FIG.28

| VALUE | EXTENDED PROGRESSION ORDER |
|---|---|
| 0000_0000 | Txxxx |
| 0000_0001 | xTxxx |
| 0000_0010 | xxTxx |
| 0000_0011 | xxxTx |
| 0000_0100 | xxxxT |

| FILE NAME 1 | DATA HAVING SAME FORMAT AS FIG.27 |
|---|---|
| FILE NAME 2 | DATA HAVING SAME FORMAT AS FIG.27 |
| FILE NAME 3 | DATA HAVING SAME FORMAT AS FIG.27 |
| FILE NAME 4 | DATA HAVING SAME FORMAT AS FIG.27 |
| FILE NAME 5 | DATA HAVING SAME FORMAT AS FIG.27 |
| FILE NAME 6 | DATA HAVING SAME FORMAT AS FIG.27 |
| .... | .... |

FIG.31

| SOT | TILE 0 | RESOLUTION 0 | TILE 0 | RESOLUTION 1 | TILE 0 | RESOLUTION 2 | SOT | TILE 1 | RESOLUTION 0 | TILE 1 | RESOLUTION 1 | TILE 1 | RESOLUTION 2 |

PACKET 0 — PACKET 1 — PACKET 2 — PACKET 0 — PACKET 1 — PACKET 2

FIG.32

| SOT | TILE 0 | RESOLUTION 0 | TILE 1 | RESOLUTION 0 | TILE 0 | RESOLUTION 1 | TILE 1 | RESOLUTION 1 | TILE 0 | RESOLUTION 2 | TILE 1 | RESOLUTION 2 |

PACKET 0 — PACKET 0 — PACKET 1 — PACKET 1 — PACKET 2 — PACKET 2

OR

| SOT | TILE 0 | RESOLUTION 0 | TILE 1 | RESOLUTION 0 | TILE 0 | RESOLUTION 1 | TILE 1 | RESOLUTION 1 | TILE 0 | RESOLUTION 2 | TILE 1 | RESOLUTION 2 |

PACKET 0 — PACKET 0 — PACKET 1 — PACKET 1 — PACKET 2 — PACKET 2

FIG.33

| PACKET 0 | PACKET 1 | PACKET 2 | PACKET 3 | PACKET 4 | PACKET 5 |
|---|---|---|---|---|---|
| TILE 0 | TILE 0 | TILE 0 | TILE 0 | TILE 0 | TILE 0 |
| LAYER 0 | LAYER 0 | LAYER 0 | LAYER 0 | LAYER 0 | LAYER 0 |
| RESOLUTION 0 | RESOLUTION 0 | RESOLUTION 0 | RESOLUTION 1 | RESOLUTION 1 | RESOLUTION 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| TILE 0 | TILE 0 | TILE 0 | TILE 0 | TILE 0 | TILE 0 |
| LAYER 0 | LAYER 0 | LAYER 0 | LAYER 1 | LAYER 1 | LAYER 1 |
| RESOLUTION 2 | RESOLUTION 2 | RESOLUTION 2 | RESOLUTION 0 | RESOLUTION 0 | RESOLUTION 0 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 12 | PACKET 13 | PACKET 14 | PACKET 15 | PACKET 16 | PACKET 17 |
|---|---|---|---|---|---|
| TILE 0 | TILE 0 | TILE 0 | TILE 0 | TILE 0 | TILE 0 |
| LAYER 1 | LAYER 1 | LAYER 1 | LAYER 1 | LAYER 1 | LAYER 1 |
| RESOLUTION 1 | RESOLUTION 1 | RESOLUTION 1 | RESOLUTION 2 | RESOLUTION 2 | RESOLUTION 2 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 0 | PACKET 1 | PACKET 2 | PACKET 3 | PACKET 4 | PACKET 5 |
|---|---|---|---|---|---|
| TILE 1 | TILE 1 | TILE 1 | TILE 1 | TILE 1 | TILE 1 |
| LAYER 0 | LAYER 0 | LAYER 0 | LAYER 0 | LAYER 0 | LAYER 0 |
| RESOLUTION 0 | RESOLUTION 0 | RESOLUTION 0 | RESOLUTION 1 | RESOLUTION 1 | RESOLUTION 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| TILE 1 | TILE 1 | TILE 1 | TILE 1 | TILE 1 | TILE 1 |
| LAYER 0 | LAYER 0 | LAYER 0 | LAYER 1 | LAYER 1 | LAYER 1 |
| RESOLUTION 2 | RESOLUTION 2 | RESOLUTION 2 | RESOLUTION 0 | RESOLUTION 0 | RESOLUTION 0 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 12 | PACKET 13 | PACKET 14 | PACKET 15 | PACKET 16 | PACKET 17 |
|---|---|---|---|---|---|
| TILE 1 | TILE 1 | TILE 1 | TILE 1 | TILE 1 | TILE 1 |
| LAYER 1 | LAYER 1 | LAYER 1 | LAYER 1 | LAYER 1 | LAYER 1 |
| RESOLUTION 1 | RESOLUTION 1 | RESOLUTION 1 | RESOLUTION 2 | RESOLUTION 2 | RESOLUTION 2 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

FIG.34

| PACKET 0 | PACKET 1 | PACKET 2 | PACKET 3 | PACKET 4 | PACKET 5 |
|---|---|---|---|---|---|
| TILE 0 | TILE 0 | TILE 0 | TILE 0 | TILE 0 | TILE 0 |
| LAYER 0 | LAYER 0 | LAYER 0 | LAYER 0 | LAYER 0 | LAYER 0 |
| RESOLUTION 0 | RESOLUTION 0 | RESOLUTION 0 | RESOLUTION 1 | RESOLUTION 1 | RESOLUTION 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| TILE 0 | TILE 0 | TILE 0 | TILE 1 | TILE 1 | TILE 1 |
| LAYER 0 | LAYER 0 | LAYER 0 | LAYER 0 | LAYER 0 | LAYER 0 |
| RESOLUTION 2 | RESOLUTION 2 | RESOLUTION 2 | RESOLUTION 0 | RESOLUTION 0 | RESOLUTION 0 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 12 | PACKET 13 | PACKET 14 | PACKET 15 | PACKET 16 | PACKET 17 |
|---|---|---|---|---|---|
| TILE 1 | TILE 1 | TILE 1 | TILE 1 | TILE 1 | TILE 1 |
| LAYER 0 | LAYER 0 | LAYER 0 | LAYER 0 | LAYER 0 | LAYER 0 |
| RESOLUTION 1 | RESOLUTION 1 | RESOLUTION 1 | RESOLUTION 2 | RESOLUTION 2 | RESOLUTION 2 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 0 | PACKET 1 | PACKET 2 | PACKET 3 | PACKET 4 | PACKET 5 |
|---|---|---|---|---|---|
| TILE 0 | TILE 0 | TILE 0 | TILE 0 | TILE 0 | TILE 0 |
| LAYER 1 | LAYER 1 | LAYER 1 | LAYER 1 | LAYER 1 | LAYER 1 |
| RESOLUTION 0 | RESOLUTION 0 | RESOLUTION 0 | RESOLUTION 1 | RESOLUTION 1 | RESOLUTION 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| TILE 0 | TILE 0 | TILE 0 | TILE 1 | TILE 1 | TILE 1 |
| LAYER 1 | LAYER 1 | LAYER 1 | LAYER 1 | LAYER 1 | LAYER 1 |
| RESOLUTION 2 | RESOLUTION 2 | RESOLUTION 2 | RESOLUTION 0 | RESOLUTION 0 | RESOLUTION 0 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 12 | PACKET 13 | PACKET 14 | PACKET 15 | PACKET 16 | PACKET 17 |
|---|---|---|---|---|---|
| TILE 1 | TILE 1 | TILE 1 | TILE 1 | TILE 1 | TILE 1 |
| LAYER 1 | LAYER 1 | LAYER 1 | LAYER 1 | LAYER 1 | LAYER 1 |
| RESOLUTION 1 | RESOLUTION 1 | RESOLUTION 1 | RESOLUTION 2 | RESOLUTION 2 | RESOLUTION 2 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

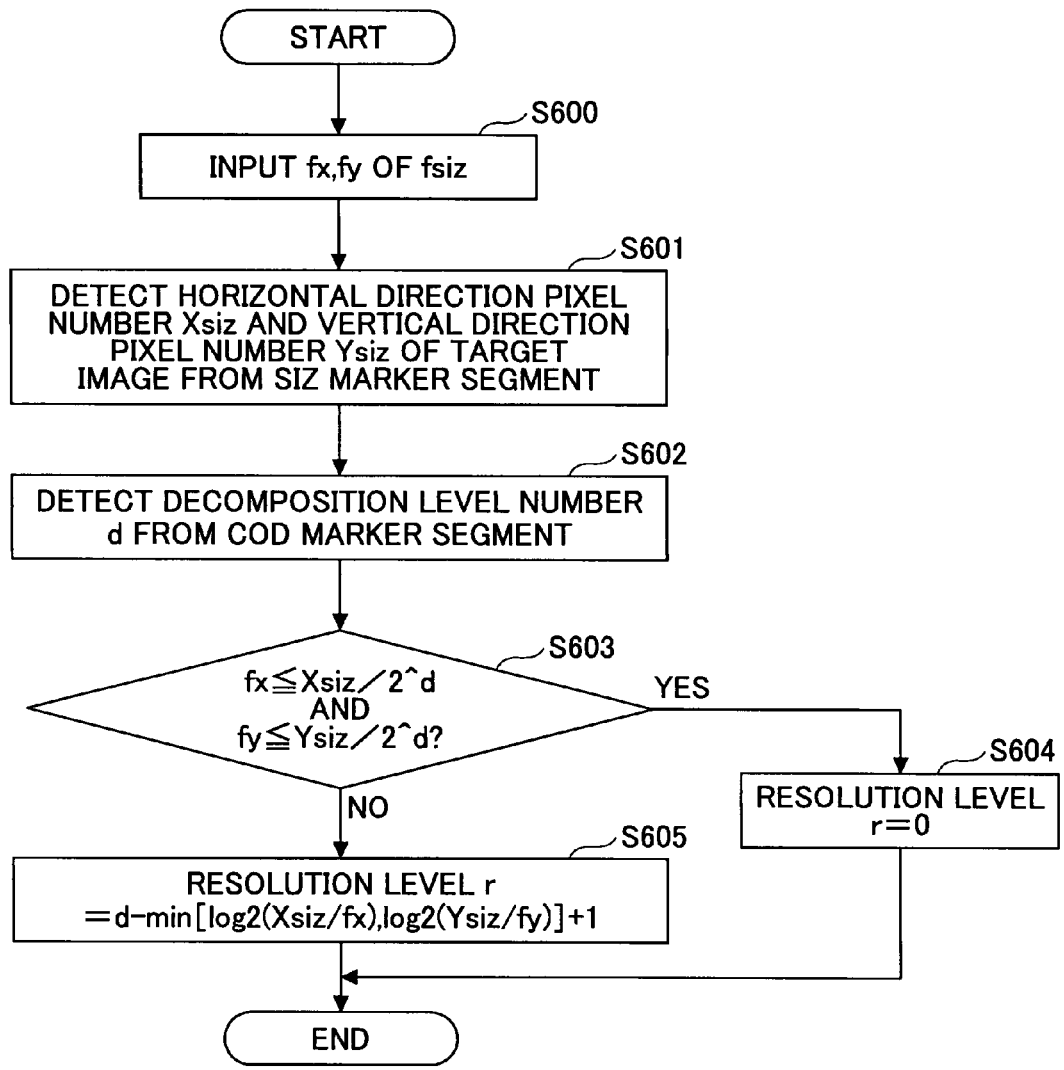

CODE PROCESSING APPARATUS AND CODE PROCESSING METHOD

PRIORITY

The present application claims priority to and incorporates by reference the entire contents of Japanese patent application 2006-109746, filed in Japan on Apr. 12, 2006.

BACKGROUND OF THE INVENTION

1. Field of the Invention

The present invention relates to a code processing apparatus and a code processing method for generating and processing files encoded with JPEG 2000 codes or JPEG 2000 family file formats.

2. Description of the Related Art

In recent years and continuing, wavelet transformation, the replacement of DCT (Discrete Cosine Transform) used by JPEG (Joint Photographic Coding Experts Group), is increasingly used in the field of image compression for performing frequency transformation. JPEG 2000, which has become an international standard, is one example of using the wavelet transformation method.

FIG. 1 is a block diagram showing an overall flow of an encoding process using JPEG 2000, in which an image (image data) is divided into rectangular tiles (number of divided parts $\geq 1$) and processed tile by tile.

In FIG. 1, each tile is transformed into color components such as brightness and chrominance (Block 1). In a case where the image data are indicated with positive numbers (e.g., RGB data), a DC level shift is also performed on the image data for reducing half of the dynamic range. The components of the image data after the image transformation (hereinafter also referred to as "tile components" or simply "tiles") are wavelet transformed to an arbitrary depth (Block 2). By performing the wavelet transformation process, the tiles are divided into sub-bands. In a single wavelet transformation process (decomposition), the tiles are divided into four sub-bands of LL, HL, LH, and HH. In the end, a single LL sub-band and plural HL, LH, HH sub-bands are formed by recursively performing the wavelet transformation process with respect to the LL sub-band.

FIG. 3 is a schematic diagram showing plural sub-bands after performing the wavelet transformation process (decomposition) for the third time. In FIG. 3, the numeral indicated in front of the sub-band (for example "3" of "3LL") represents a decomposition level (number of times on which wavelet transformation is performed). FIG. 3 is also for showing the relationship between decomposition levels and resolution levels.

In a case of using an irreversible wavelet transformation called "9×7 transformation", the wavelet coefficients for each sub-band are subject to linear quantization (including normalization) (Block 3). Then, the sub-bands are subject to an entropy coding process (Block 4). By performing the entropy coding process, each sub-band is divided into rectangular regions referred to as "precincts". Three precincts located at the same region of each of the sub-bands HL, LH, HH are handled as a single precinct partition. However, the precinct obtained by dividing sub-band LL is handled as a single precinct partition. The precinct basically serves to indicate a predetermined part (position) in the image. The precinct may have the same size as a sub-band. The precinct is further divided into rectangular regions referred to as "code-blocks". FIG. 2 is a schematic diagram for showing the relationship of the tile, the sub-band, the precinct, and the code-block. As shown in FIG. 2, the relationship of the order of the physical sizes of image, tile, sub-band, precinct, and clock can be expressed as "image$\geq$tile>sub-band$\geq$precinct$\geq$code-block". After the image is divided in the manner described above, entropy encoding of coefficients (bit-plane coding) is performed on each code block in a bit-plane order.

Then, the entropy coded data are grouped (organized) together to generate a packet (Block 5). The packet consists of a packet body formed by gathering a portion of the bit-plane codes from all the code-blocks included in a precinct (for example, bit-plane codes obtained from the MSB (Most Significant Bit) bit-plane to the third level bit-plane) and a packet header attached to the packet body. Since a portion of the bit-plane codes may be empty, the inside of the packet may in some cases be empty from a coding aspect. The packet header includes data of the codes (contents) included in the packet. Each packet is handled independently. In other words, a packet is a unit of a code.

Accordingly, a portion of all codes of the entire image is obtained by collecting the packets of all precincts (=all code-blocks=all sub-bands) (e.g. obtaining the codes of the wavelet coefficients of the entire image from the MSB bit-plane to the third level bit-plane). This obtained portion is referred to as a "layer". Since the layer is basically a portion of the codes of the bit-planes of the entire image, image quality becomes higher as the number of decoded layers increases. That is, the layer is a unit of image quality. The codes of all of the bit-planes in the entire image can be obtained by collecting all of the layers.

The upper part of FIG. 4 shows an exemplary layer configuration in a case where "decomposition level=2", and "precinct size=sub-band size". The lower part of FIG. 4 shows packets included in several layers of the layer configuration (illustrated in a manner encompassed by thick lines in FIG. 4).

Thereby, in accordance with the generated packets and the manner in which the layers are divided, the packets are arranged in a predetermined order and added with tags and tag data. Accordingly, a final JPEG 2000 code (codestream) can be formed (Block 6).

It can be understood from the above description that each packet has four characteristics (indices) indicating the component of the packet (hereinafter also indicated with symbol "C"), the resolution level (hereinafter also indicated with symbol "R"), the precinct of the packet (hereinafter also indicated as "position" or symbol "P"), and the layer (quality layer) (hereinafter also indicated with symbol "L"). The characteristics (indices) of the packet are hereinafter referred to as "progression characteristics". A packet header is provided at the beginning of the packet. Although the packet header is followed by MQ codes (packet data), the packet header does not have the progression characteristics themselves written therein.

The arrangement of the packets is defined according to the order in which the progression characteristics of the packets (including the packet header and the packet data) are arranged. The order of the progression characteristics defining the packet arrangement is referred to as a progression order. Different progression orders can be obtained by using a collection of nested loops. FIG. 5 shows five different types of progression orders. The manner in which an encoder arranges (encodes) the packets according to the progression order and the manner in which a decoder interprets (decodes) the characteristics of the packets according to the progression order are described below.

For example, in a case where the progression order is LRCP, the packet arrangement (encoding) or interpretation (decoding) is conducted according to a "for loop" shown below.

```
for (layer) {
  for (resolution) {
    for (component) {
      for (precinct) {
        during encoding:packet arrangement
        during decoding:packet characteristic interpretation
      }
    }
  }
}
```

The packet header of each packet is written with data indicating whether the packet is empty, which code blocks are included in the packet, the number of zero bit planes of each of the code blocks included in the packet, the number of coding passes of the codes of each of the code blocks included in the packet (the number of bit planes), and the code length of each of the code blocks included in the packet. However, data indicating, for example, a layer number or resolution level are not written in the packet header. Therefore, in order to determine the resolution level or the layer of a packet during a decoding operation, it is necessary to generate a for loop (such as the one described above) based on a progression order written in, for example, a COD marker segment (for example, see FIGS. 17 and 18) in the main header, identify a discontinuity of the packet according to the sum of the code length of each of the code blocks included in the packet, and determine the part of the for loop in which the packet is handled. Accordingly, by simply reading out the code length indicated in the packet header, the next packet can be detected (that is, a given packet can be accessed) without having to decode packet data (entropy codes).

It is to be noted that the outermost part of the nest of the for loop is referred to as "outermost part of the progression order".

FIG. 6 is a schematic diagram for describing a progressive by layer codestream such as an LRCP progression order codestream having a layer characteristic (L) situated at the outermost part of the progression order. In this example, the number of tile parts is one.

FIG. 7 shows an example of an arrangement of 36 packets according to an LRCP progression order (order of interpreting packets) in a case where the conditions are "image size=100×100 pixels", "no tile division (one tile)", "two layers", "resolution level number=3 (0-2)", "three components (0-2)", and "precinct size=32×32". It is to be noted that the number of tile parts in this example is one.

FIG. 8 is a schematic diagram for describing a progressive by resolution codestream such as an RLCP progression order codestream having a resolution characteristic (R) situated at the outermost part of the progression order. In this example, the number of tile parts is one.

FIG. 9 shows an example of an arrangement of 36 packets according to an RLCP progression order (order of interpreting packets) in a case where the conditions are "image size=100×100 pixels", "no tile division (one tile)", "two layers", "resolution level number=3 (0-2)", "three components (0-2)", and "precinct size=32×32". It is to be noted that the number of tile parts in this example is one.

The code (codestream) for each tile can be further divided into plural parts at the discontinuities of packets. These divided parts are referred to as "tile parts". As described above, the number of tile parts for the packet arrangement shown in FIGS. 7 and 9 is one.

Besides packets, each tile part includes a header starting from a SOT (Start Of Tile-part) marker segment and terminating at a SOD (Start Of Data) marker. This header is hereinafter also referred to as a "tile-part header" (See FIGS. 6 and 8).

FIG. 10 is a schematic diagram showing an exemplary configuration of a SOT marker segment. It is to be noted that a part including a marker (in this example, an SOT marker) and parameters related to the marker is hereinafter also referred to as "marker segment". FIG. 11 shows the content of the parameters of the SOT marker segment. According to FIG. 11, the length of a particular tile part can be detected (determined) by reading out the content of parameter "Psot" included in the SOT marker segment. Accordingly, by reading out the SOT marker segment, access can be made to codes (codestreams) in tile part units without having to decode the packet header.

In a case where the process of decoding the packet header is desired to be omitted, the length of each packet may be recorded in, for example, a PLT marker segment inside the tile-part header or a PLM marker segment inside the main header. Furthermore, in a case where it is desired that the process of searching for the SOT marker segment be omitted, the length of each tile part may be recorded in a TLM marker segment inside the main header. FIG. 12 shows an exemplary configuration of the TLM marker segment. FIG. 13 shows the content of the parameters of the TLM marker segment. According to FIG. 13, the length of a particular tile part (e.g. the $i^{th}$ tile part) can be detected (determined) by reading out the content of parameter "Ptlm (i)" included in the TLM marker segment.

As described above, the JPEG 2000 codestream can be accessed in units of packets as well as in units of tile parts. With the JPEG 2000 codestream, new codes (codestreams) can be generated by extracting only packets and tile parts required without having to decode the entire original codes. Furthermore, the JPEG 2000 codestream enables decoding of a necessary amount (number) of packets and tile parts in the original codes.

For example, in a case of displaying a large image stored in a server (PC) on a client (PC), the client (PC) can decode the image data of the image by receiving only the codes of necessary image quality, codes of necessary resolution, codes of an area (precinct) desired to be viewed, or codes of a component desired to be viewed from the server (PC).

This protocol of receiving only required portions of a JPEG 2000 codestream from a server is hereinafter also referred to as JPIP (JPEG 2000 Interactive Protocol). This protocol is currently in the middle of being standardized. As for protocols for accessing a portion(s) of a multi-layer (multi-level) image, there are, for example, FlashPix (used for expressing multiple image resolutions) and IIP (Internet Imaging Protocol) used for accessing such FlashPix images (for example, see Japanese Laid-Open Patent Application No. 11-205786 and website http://www.i3a.org/i_iip.html showing a standard reference of IIP). As a reference of JPIP, there is, for example, Japanese Laid-Open Patent Application No. 2003-23630 showing a JPIP cache model.

In the JPIP protocol, a methodology of designating a desired resolution of a particular image and a window size for actually depicting the image is proposed. In a case where a server (PC) receives such designation, the server (PC) may either use a method (system) of transmitting packets covering a particular area of the image with a designated resolution or a method (system) of transmitting tile parts covering a particular area of the image.

Next, an example of the latter JPIP system of transmitting tile parts is described (hereinafter also referred to as "JPT system").

In a case where the JPT system is used, tile parts covering a particular area of an image are extracted from the tile parts of the entire image in the following manner. In this case, it is a premise that the server (PC) knows how the tile parts of the codes (codestreams) managed by the server (PC) itself are divided.

For example, in a case where packets of the RLCP progression order codestream corresponding to one tile and two layers as shown in FIG. 9 are divided at the boundaries (discontinuities) of all resolution levels (area where the resolution level is switched from one level to another), three tile parts (tile parts 0-2) can be obtained as shown in FIG. 14. Furthermore, in a case where the same packets of the RLCP progression order codestream are divided at the boundaries (discontinuities) of all resolution levels and the boundaries (discontinuities) of all layers, six tile parts (tile parts 0-5) can be obtained as shown in FIG. 15. Furthermore, in a case where the same packets of the RLCP progression order codestream are divided at the boundaries (discontinuities) of all resolution levels, the boundaries (discontinuities) of all layers, and the boundaries (discontinuities) of all components, eighteen tile parts (tile parts 0-17) can be obtained.

When a client (PC) transmits a request to a server (PC) indicating that a resolution portion corresponding to 25×25 pixels is desired to be displayed in a 20×20 window size (in the example shown in FIG. 9, the "resolution part corresponding to 25×25 pixels" indicates the portion where the resolution level is 0 and the "20×20 window size" indicates 20×20 pixels among the pixels having a resolution level of 0), the server (PC) extracts tile parts covering resolution level 0 (tile part 0 in FIG. 14) and transmits the extracted tile parts together with main header data of the codestream. Since each tile part has an SOT marker segment and the length of the tile part can be determined, the boundaries of the tile parts can be distinguished.

As shown in FIGS. 14-16, the tile parts to be transmitted (i.e. from tile part no. x to tile part no. y) are determined according to two parameters. The first parameter is the progression order of the codestream and the second parameter is the method of dividing a codestream into tile parts (divided location).

The first parameter (progression order) can be easily determined since the progression order is written in a COD marker segment of a main header or a tile part header. However, the second parameter (dividing method) is not recorded in the JPEG 2000 codestream or the JPEG 2000 file format family. Therefore, conventionally, unless the dividing method is known beforehand, it becomes necessary to count the packets in the codestream one by one in order to select a desired tile part. However, such counting of packets is inefficient.

Accordingly, in Japanese Patent Application No. 2006-67482, the applicant of the present invention proposes a method of recording data indicating the dividing method in a COM marker segment (a marker segment allowed to freely include data, for example, vendor data according to JPEG 2000 codestream format) or recording the data in a UUIDBox or a XMLBox (Box is allowed to freely include, data, for example, vendor data according to JPEG 2000 family file format).

In a case of a server using the JPT method (JPT server), the JPT server conducts a two step operation including a calculation step for calculating the position (location) of each tile part and a transmission step for transmitting a particular tile part(s) when required. In one example, the server may be configured to i) calculate the positions of all of the tile parts (scanning of SOT marker segment) and ii) transmit a particular tile part(s) when required.

Therefore, the JPT server normally conducts the following step (hereinafter referred to as "Step A") of:

```
for (with respect to all tile parts) {
    scan next SOT marker segment and record position and length of tile part
}
```

One reason that this step is used is because the tile parts required to be transmitted may change chronologically due to, for example, the window size designated by the user of the client (PC). Therefore, it is desirable that the server (PC) calculate and store the locations of the all of the tile parts beforehand prior to determining whether to transmit a tile part(s). Another reason is due to the arrangement of tile parts in the codestream.

In using the JPT method, one important factor is the order in which the tile parts of the codestream is arranged. The method of arranging tile parts (tile part arrangement method) is described using an example of a codestream of a monochrome image (see FIG. 24) where the codestream is divided into tile parts at the boundary parts having a maximum resolution level=2 and a layer number=1.

In this example, a tile index (characteristic) indicating which tile is selected (designated) may be added to the conventional R, L, C, P progression order, so that the tile parts are arranged in a "tile order to resolution level order" (this order having the tile index (tile characteristic) situated at an outermost part of the progression order is referred to as "highest tile order") as shown in FIG. 25 or arranged in a "resolution level order to tile order" as shown in FIG. 26.

In a case where tile parts, for example, corresponding to resolution level 0 are requested from the JPT server, a total of four tile parts is sufficient for arranging packets of a codestream having a tile part arrangement shown in FIG. 25 since the packets of the codestream can be arranged by simply obtaining data indicating the position and length from the first tile part to tile part "A" (as long as there is no change in the tile part(s) requested). In this case, even where the above-described Step A (scanning of all tile parts) is conducted, the total tile parts scanned are merely six tile parts. Therefore, few tile parts (in this case, two tile parts) do not actually have to be subject to SOT scanning.

On the other hand, in a case of arranging packets of a codestream having a tile part arrangement shown in FIG. 26, a total of two tile parts is sufficient for arranging the packets of the codestream having a tile part arrangement shown in FIG. 26 since the packets of the codestream can be arranged by obtaining data indicating the position and length from the first tile part to tile part "B" (as long as there is no change in the tile part(s) requested). Therefore, in a case where the above-described Step A (scanning of all tile parts) is conducted, six tile parts are subject to SOT scanning. Thus, ⅔ of the scanned tile parts do not actually have to be subject to SOT scanning.

In a case where the arrangement of the tile parts as shown in FIG. 26 is known beforehand, the following for loop for arranging the tile parts in a "resolution order to tile order" may be used.

```
for (resolution level = 0) {
  for (0≦ tile index≦ 1) {
    scan the next SOT marker segment and record the position and length of
    tile part
  }
```

By using the above for loop, only two tile parts need to be scanned. This prevents unnecessary scanning of tile parts. In order for this for loop to be used (or in order to calculate the number of necessary tile parts from the beginning and controlling the number of times for scanning the SOT marker segment), it is a premise that the arrangement of the tile parts can be determined (known beforehand). However, the arrangement of the tile parts in a codestream is not recorded in a conventional JPEG codestream or a JPEG 2000 family file format.

It is to be noted that a characteristic (index) corresponding to the purpose of use is typically positioned at an outermost part of the progression order in a case of JPT or JPP (JPIP precinct). For example, in a case where the main purpose is to display a size-reduced image, the characteristic of R (resolution) is positioned at the outermost part of the progression order. In a case where the main purpose is to display a monochrome image of a color image, the characteristic of C (component) is positioned at the outermost part of the progression order. Furthermore, in JPT, the tile parts are typically divided at boundaries of the characteristic corresponding to the above-described purpose.

Taking the above-described aspects into consideration, the applicant of the present invention proposed a method of recording data indicating the tile part dividing method and arrangement method in a COM marker segment of a codestream or a box such as UUIDBox or XMLBox of a JPEG 2000 family file format (See Japanese Patent Application No. 2006-77206).

It is also to be noted that it is a premise that each tile is to be divided into two or more tile parts at the boundaries of resolution level so that the tile parts can be arranged from "resolution level order to tile order" as shown in FIG. 26. This is because such tile part arrangement cannot be conducted in a case of 1 tile part/1 tile.

SUMMARY OF THE INVENTION

A code processing apparatus and code processing method are described. In one embodiment, the process comprises a packet arranging part for arranging the order of packets included in the JPEG 2000 codestream according to an extended progression order selected from a group of extended progression orders including "xTxxx", "xxTxx", "xxxTx", and "xxxxT"; wherein each "x" in the extended progression orders represents one of a resolution level characteristic, a layer characteristic, a component characteristic, and a precinct characteristic, wherein the leftmost "x" of each extended progression order corresponds to an outermost characteristic of the extended progression order, and wherein "T" represents a tile characteristic.

BRIEF DESCRIPTION OF THE DRAWINGS

FIG. 3 is a schematic diagram for describing an example of sub-band division and a relationship between decomposition level and resolution level;

FIG. 5 is a schematic diagram for describing a progression order according to JPEG 2000 standards;

FIG. 7 is a schematic diagram showing an example of a packet arrangement of a codestream according to an LRCP progression order;

FIG. 9 is a schematic diagram showing an example of a packet arrangement of a codestream according to an RLCP progression order;

FIG. 10 is a schematic diagram showing an exemplary configuration of an SOT marker segment;

FIG. 11 is a table showing the content of an SOT marker segment;

FIG. 14 is a schematic diagram showing an example of dividing packets of a codestream into tile parts at the boundaries of all resolution levels;

FIG. 15 is a schematic diagram showing an example of dividing packets of a codestream into tile parts at the boundaries of all resolution levels and the boundaries of all layers;

FIG. 16 is a schematic diagram showing an example of dividing packets of a codestream into tile parts at the boundaries of all resolution levels, the boundaries of all layers, and the boundaries of all components;

FIG. 17 is a schematic diagram showing an exemplary configuration of a COD marker segment;

FIG. 18 is a table showing byte expressions of an ordinary progression order in a Sgcod of a COD marker segment;

FIG. 19 is a schematic diagram showing an exemplary configuration of a COM marker segment;

FIG. 21 is a schematic diagram showing an exemplary Box configuration;

FIG. 22 is a table for describing the content of data in a Box;

FIG. 27 is a table showing an example of byte data corresponding to extended progression orders;

FIG. 28 is a table showing another example of byte data corresponding to extended progression orders;

FIG. 31 is a schematic diagram showing an exemplary packet arrangement of a codestream of the monochrome image of FIG. 30 according to a RLCP progression order;

FIG. 32 is a schematic diagram showing an exemplary packet arrangement of a codestream of the monochrome image of FIG. 30 according to a RTLCP progression order;

FIG. 33 is a schematic diagram showing an exemplary packet arrangement of a codestream according to a TLRCP progression order;

FIG. 34 is a schematic diagram showing an exemplary packet arrangement of a codestream according to a LTRCP progression order;

FIG. 41 is a flowchart showing processes included in step S502 of FIG. 40 according to an embodiment of the present invention.

DESCRIPTION OF THE PREFERRED EMBODIMENTS

Embodiments of the present invention include a code processing apparatus and a code processing method that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Embodiments as well as other features and advantages of the present invention will be realized and attained by a code processing apparatus and a code processing method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention includes a code processing apparatus for generating a file including a JPEG 2000 codestream or a JPEG 2000 family format including the JPEG 2000 codestream, the code processing apparatus including: a packet arranging part for arranging the order of a plurality of packets included in the JPEG 2000 codestream according to an extended progression order selected from a group of extended progression orders including "xTxxx", "xxTxx", "xxxTx", and "xxxxT"; wherein each "x" in the extended progression orders represents one of a resolution level characteristic, a layer characteristic, a component characteristic, and a precinct characteristic, wherein the leftmost "x" of each extended progression order corresponds to an outermost characteristic of the extended progression order, and wherein "T" represents a tile characteristic.

Other embodiments and further features of the present invention will be apparent from the following detailed description when read in conjunction with the accompanying drawings.

In the following, embodiments of the present invention are described with reference to the accompanying drawings.

Figure 26:
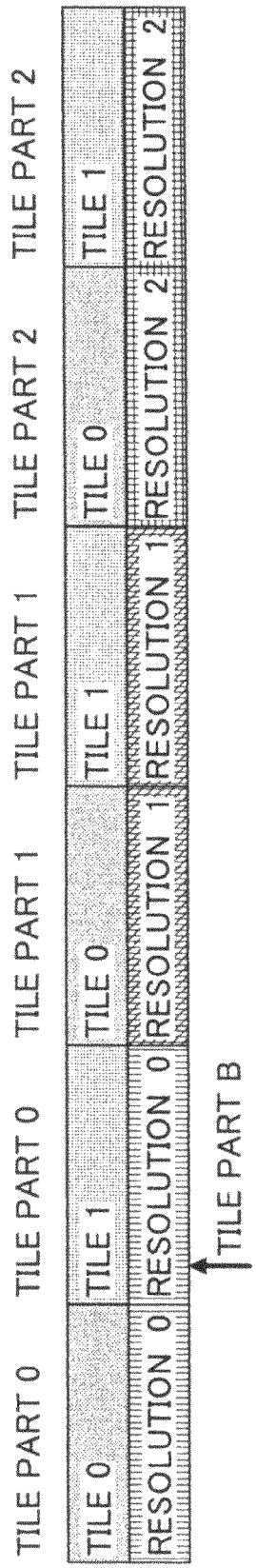
FIG. 26 is a schematic diagram showing another example of a tile part arrangement of a codestream of the monochrome image of FIG. 24.

As described above, a JPEG 2000 codestream includes plural packets in which each packet corresponds to a given resolution level. Accordingly, all packets belonging to a particular tile of a particular resolution level can be arranged to form a tile part that is partitioned at the boundaries of resolution level. Thus, the packets can be arranged from "resolution order to tile order" as shown in FIG. 26 and stored in the server with such arrangement. An embodiment of the present invention adds a tile characteristic (index) to the progression characteristics (indices) R, L, C, and P of the JPEG 2000 progression order and arranges the packets from "resolution level order to tile order".

Since the packets are arranged from "resolution order to tile order" according to the extended progression order having added a tile characteristic, the generated codestream does not comply with the JPEG 2000 standard. Thus, technically, the generated JPEG 2000 codestream according to an embodiment of the present invention is not an official (legal) JPEG 2000 codestream but is a JPEG 2000-like codestream. Nevertheless, as long as the server (PC) properly interprets and manages the packets having such arrangement, the packets can be handled in the same manner as an official (legal) JPEG 2000 codestream and yet be able to attain an advantage of easily and efficiently accessing and selecting a required packet without having to scan unnecessary packets.

In JPEG 2000, the types of an ordinary progression order using the progression characteristics (indices) of R, L, C, and P are expressed as LRCP, RLCP, RPCL, PCRL and CPRL as shown in FIG. 5.

Meanwhile, an embodiment of the present invention expresses the added progression characteristic as "T" (tile) so that extended progression orders of Txxxx, xTxxx, xxTxx, xxxTx, and xxxxT can be obtained. In the extended progression orders, the leftmost "x" corresponds to the characteristic (index) situated at the outermost part of the progression order, and each "x" represents one of R, L, C, and P. Thereby, the packets in the JPEG codestream (JPEG-like codestream) can be arranged according to the extended progression order selected from a group of extended progression orders including "xTxxx", "xxTxx", "xxxTx", and "xxxxT". In other words, the packets in the JPEG codestream (JPEG-like codestream) can be arranged having the progression characteristics other than the outermost progression characteristic sorted according to tile order.

As shown in FIG. 27, there are 25 different kinds of the extended progression order starting from TLRCP to CPRLT. It is however to be noted that the Txxx (i.e. the first five kinds of extended progression orders TLRCP, TRLCP, TPCRL, and TCPRL) have packets arranged substantially in the same manner as ordinary progression orders of LRCP, RLCP, PCRL, and CPRL. For example, in a case of a codestream having plural tiles, for example, a LRCP codestream, packets are arranged according to a TLRCP order.

As described above, a JPEG 2000 codestream may have a COM marker segment for allowing discretionary data such as vendor data to be recorded therein. An exemplary configuration of the COM marker segment is shown in FIG. 19. In the configuration shown in FIG. 19, discretional data can be recorded in the Ccom(i) part in units of bytes.

Figure 20:
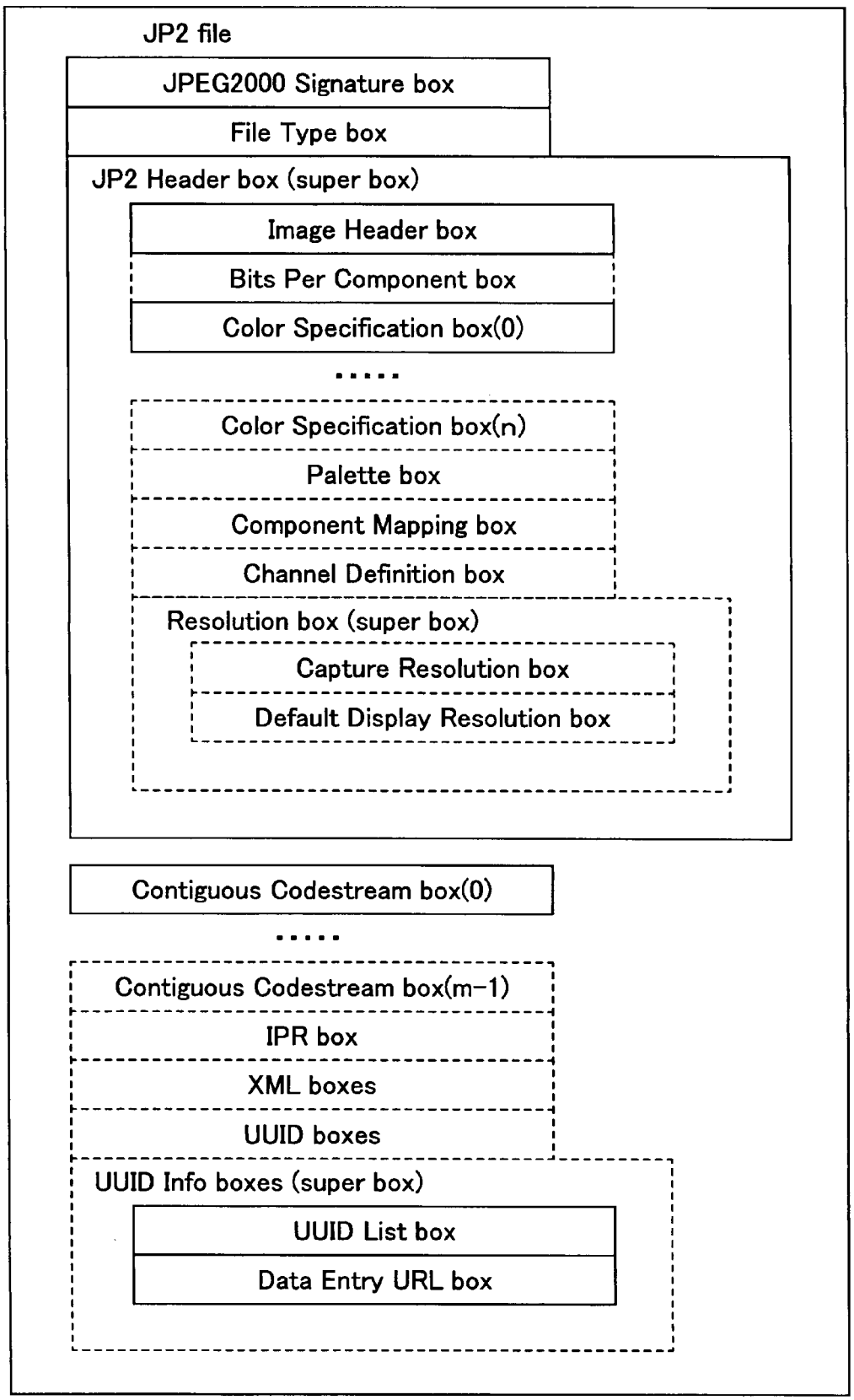
FIG. 20 is a schematic diagram showing an exemplary configuration of a JP2 file format.

The above-described JPEG 2000 file format family includes, for example, a JP2 file format, a JPX file format, and a JPM file format. FIG. 20 shows an exemplary file configuration of a JP2 file format. In the configuration shown in FIG. 20, discretional data may be recorded in the UUIDBox and the XMLBox. FIG. 21 is a schematic diagram showing an exemplary Box configuration for the UUIDBox and the XMLBox. FIG. 22 is a table showing the content of the data included in various boxes. Discretional data may be recorded in a DBox of the UUIDBox and a DBox of the XMLBox.

The JPX file format is an extended file format of JP2. Although not shown in the drawings, the configurations of the UUIDBox and the XMLBox of the JPX file format are the same as those of the JP2 file format.

Figure 23:
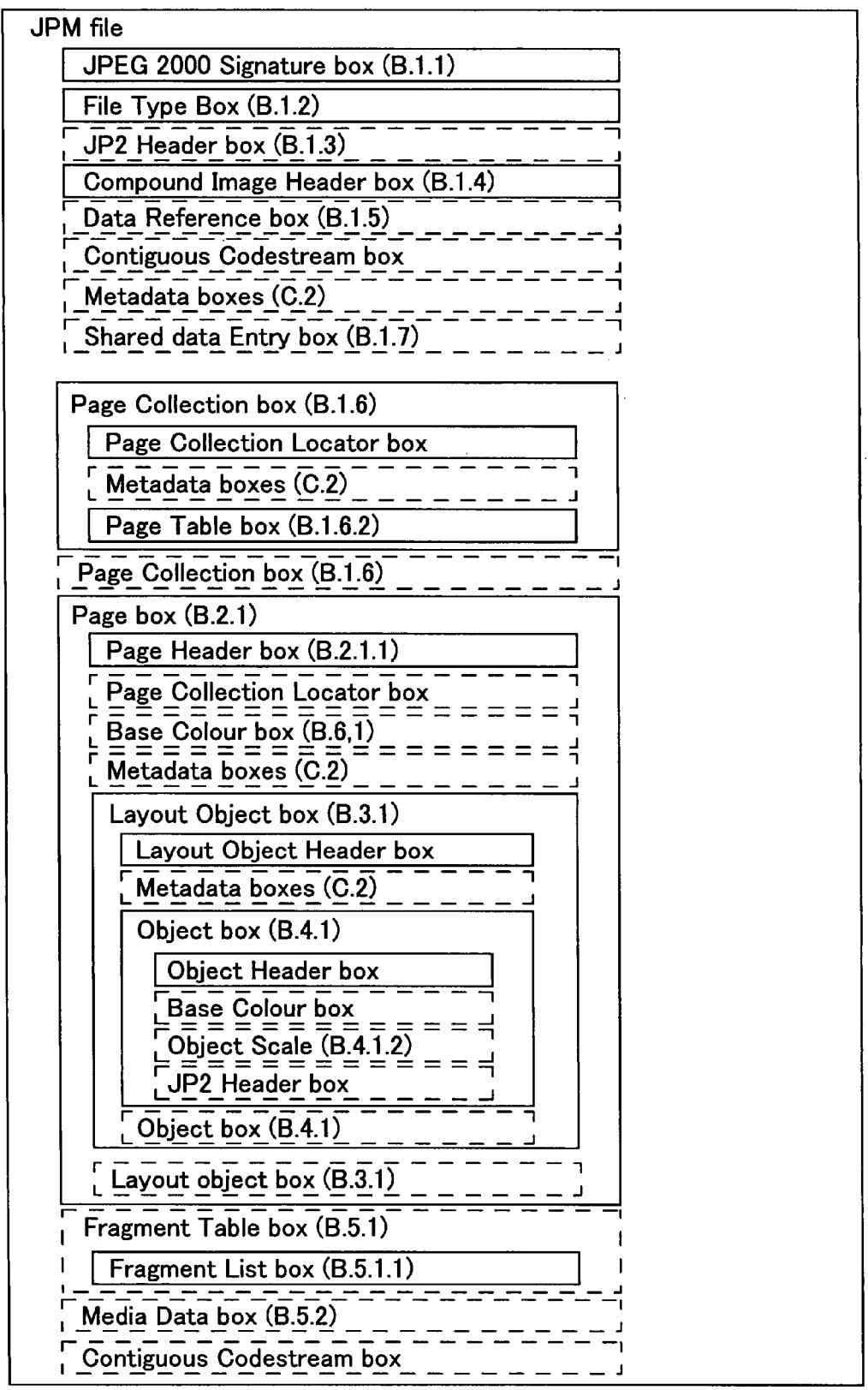
FIG. 23 is a schematic diagram showing an exemplary configuration of a JPM file format.
Figure 24:
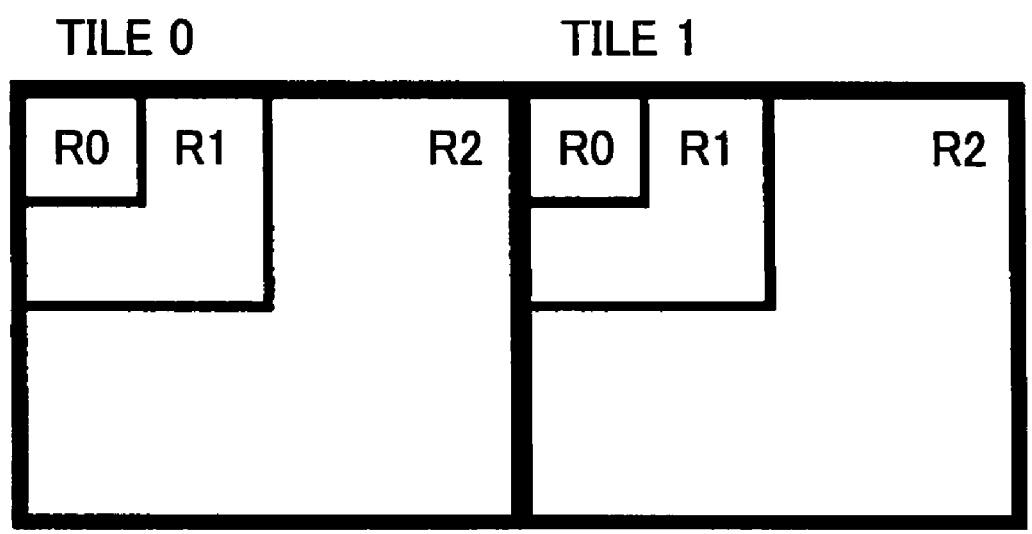
FIG. 24 is a schematic diagram for describing a code of a monochrome image composed of two tiles.
Figure 25:
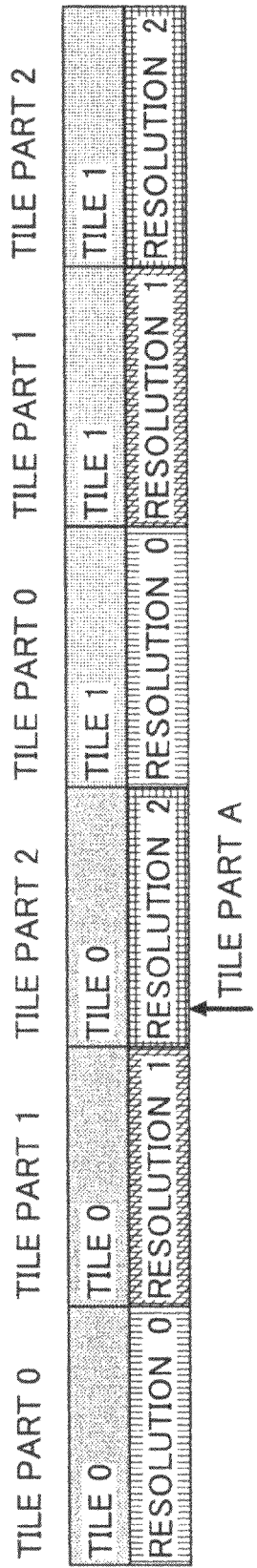
FIG. 25 is a schematic diagram showing an example of a tile part arrangement of a codestream of the monochrome image of FIG. 24.

Furthermore, FIG. 23 shows an exemplary file configuration of a JPM (JPEG 2000 Multi-layer) file format. The MetadataBox of C.2 of the JPM file format shown in FIG. 23 has substantially the same Box configuration as that of the UUIDBox and the XMLBox shown in FIG. 21. Discretional data can be recorded in the MetadataBox.

Figure 35:
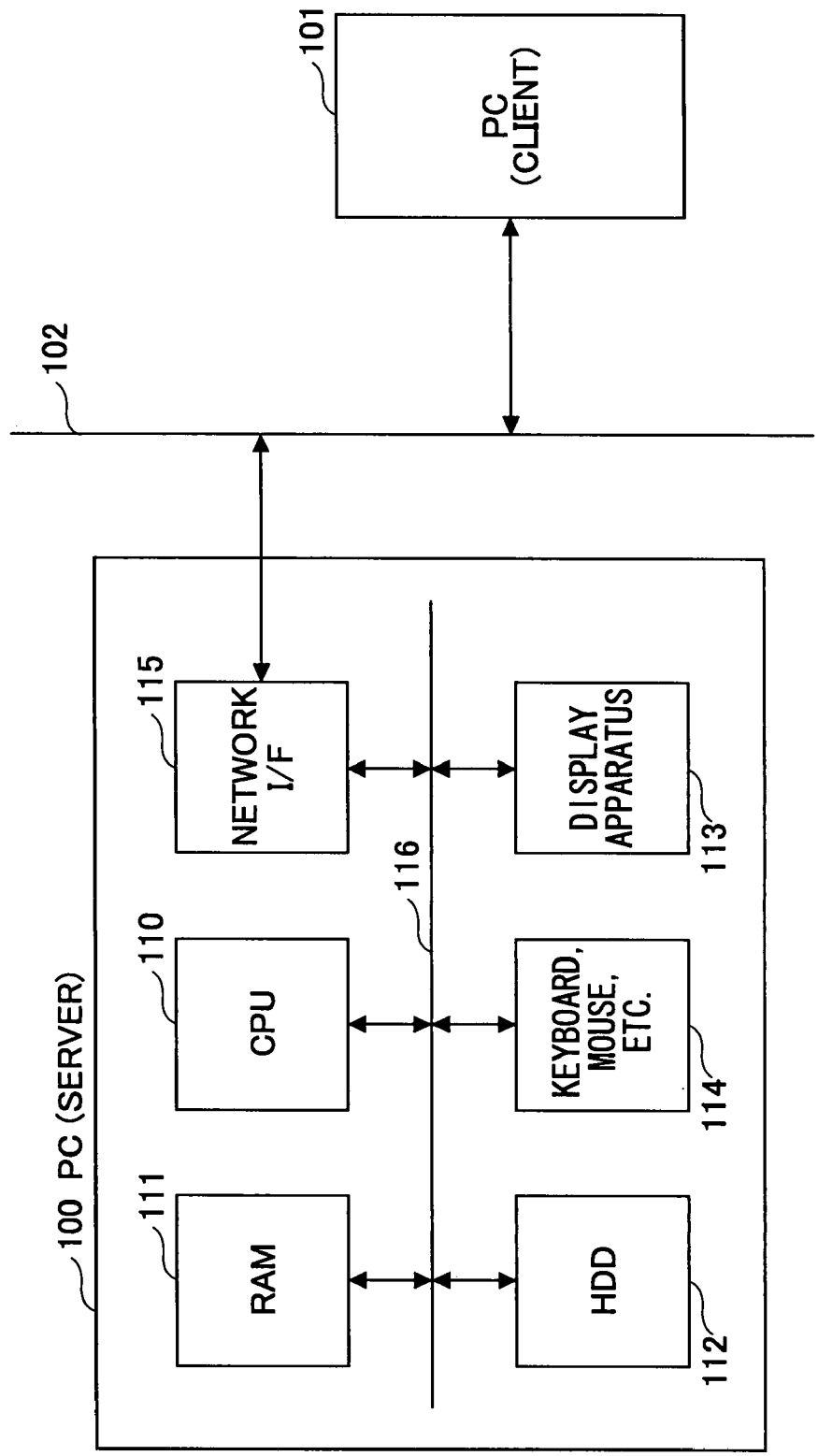
FIG. 35 is a block diagram showing a system configuration including the code processing apparatus according to an embodiment of the present invention.

An embodiment of the present invention may be executed, for example, by using a system shown in FIG. 35. In FIG. 35, reference numerals 100 and 101 indicate a personal computer (PC). The PC (server) 100 and the PC (client) can communicate with each other via a network (e.g., LAN, intranet, Internet) 102.

The PC (server) 100 has, for example, a CPU 110, a RAM 111, a hard disk apparatus 112, a display apparatus 113, an input apparatus (e.g., keyboard, mouse) 114, and a network interface (I/F) 115 which are connected with a bus 116. The PC (client) 101 may also have the same configuration as the PC (server) 100. The PC 100 and PC 101 may also be referred to as a code processing apparatus.

An embodiment of the present invention may be executed independently by each PC 100 and 101 or executed as a client/server system where PC 101 is the client and PC 100 is the server. Furthermore, client software and server software may be installed in the PC 101 and the PC 100, respectively, in order to realize a client/server system for executing an embodiment of the present invention. Furthermore, the below-described embodiments of the present invention may also executed in the form of hardware dedicated to perform various functions of the below-described embodiment of the present invention.

First Embodiment

Figure 36:
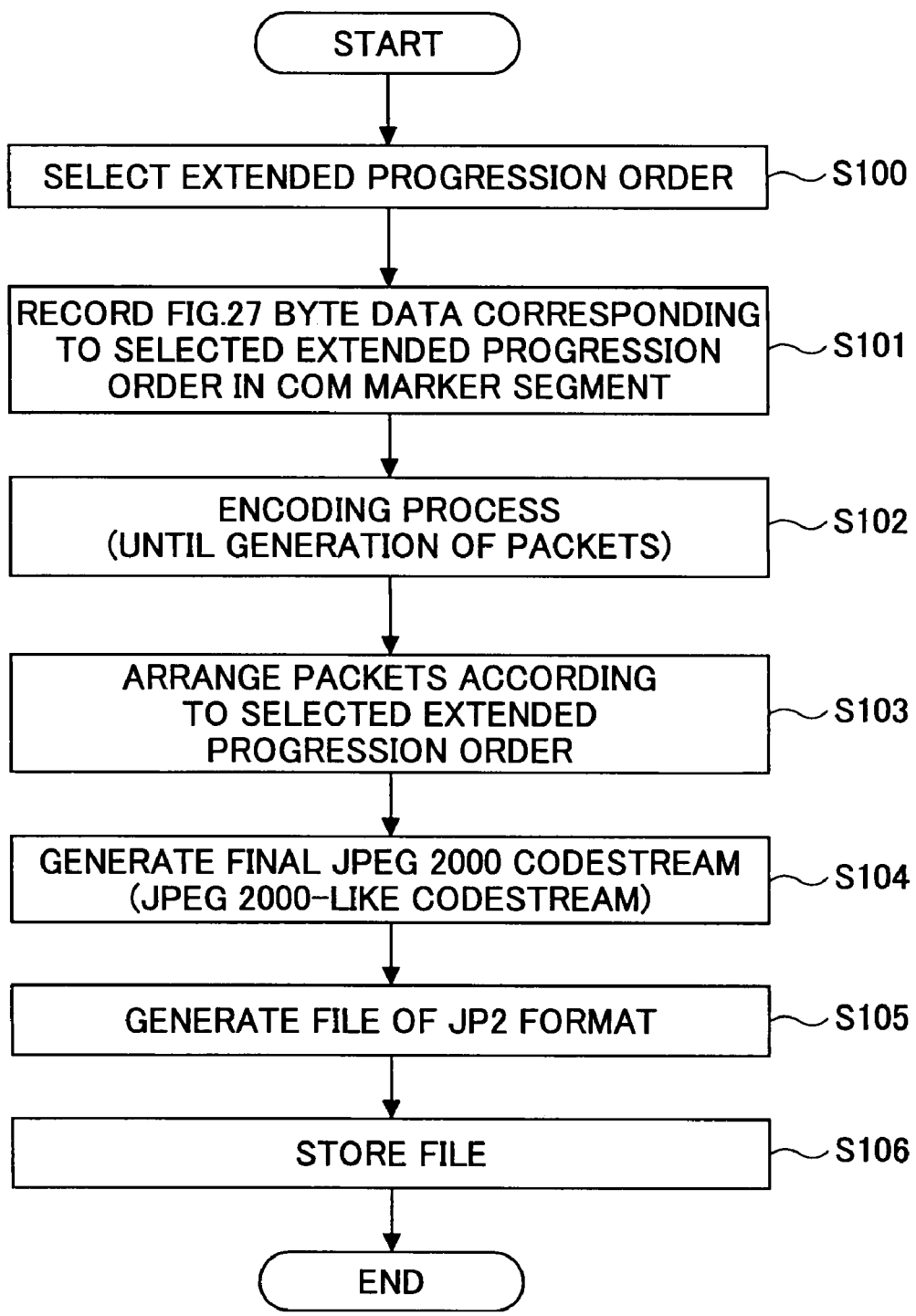
FIG. 36 is a flowchart showing a code processing method according to the first embodiment of the present invention.

FIG. 36 is a flowchart for describing a code processing method (codestream generating operation) according to a first embodiment of the present invention. The steps including the JPEG 2000 encoding step illustrated in the flowchart of FIG. 36 are executed in the PC 100 or 101 (shown in FIG. 35), for example, by using predetermined software (program). The program for executing the steps is stored in the hard disk apparatus 112. The program is loaded to the RAM (main memory) 111 and executed by the CPU 110. In a case where the PC 100 has a hardware encoder for JPEG 2000, the JPEG encoding process may be executed by the encoder. This configuration of hardware and software of the PC 100, 101 also applies to the below-described second, third, and fourth embodiments of the present invention.

The image data to be processed are stored in the hard disk apparatus 112. Then, the image data are transferred to the RAM 111 and processed by the CPU 110. As a result of the processing by the CPU 110, a JPEG 2000 code (codestream) and a JP2 file having the codestream stored therein are generated in the RAM 111. Then, the JP2 file is transferred to the hard disk apparatus 112 and stored in the hard disk apparatus 112. This configuration of hard disk apparatus 112 and the RAM 111 also applies to the below-described second, third, and fourth embodiments of the present invention.

In the flowchart shown in FIG. 36, the CPU 110 of the PC 100 selects an extended progression order from xTxxx, xxTxx, xxxTx, and xxxxT (Step S100). For example, in a case where a user of the input apparatus 114 designates a particular extended progression order, the CPU 110 selects the designated extended progression order. The extended progression order may also be designated from the PC (client) 101. Alternatively, a predetermined extended progression order (chosen beforehand) may be selected.

Then, the CPU 110 records byte data shown in FIG. 27 corresponding to the selected extended progression order in a COM marker segment (Step S101). More specifically, a COM marker segment having the byte data recorded therein is recorded in a main header area of a JPEG 2000 format area provided in the RAM 111. FIG. 19 shows an exemplary configuration of the COM marker segment according to an embodiment of the present invention. Since the byte data are binary data as shown in FIG. 27, Rcom is set to satisfy a relationship of Rcom=0. The byte data are recorded as comment data (C(com(0)) in the COM marker segment. Since the length of the marker segment without the COM marker is 5 bytes (=2+2+1), Lcom is set to satisfy a relationship of Lcom=5.

Figure 1:
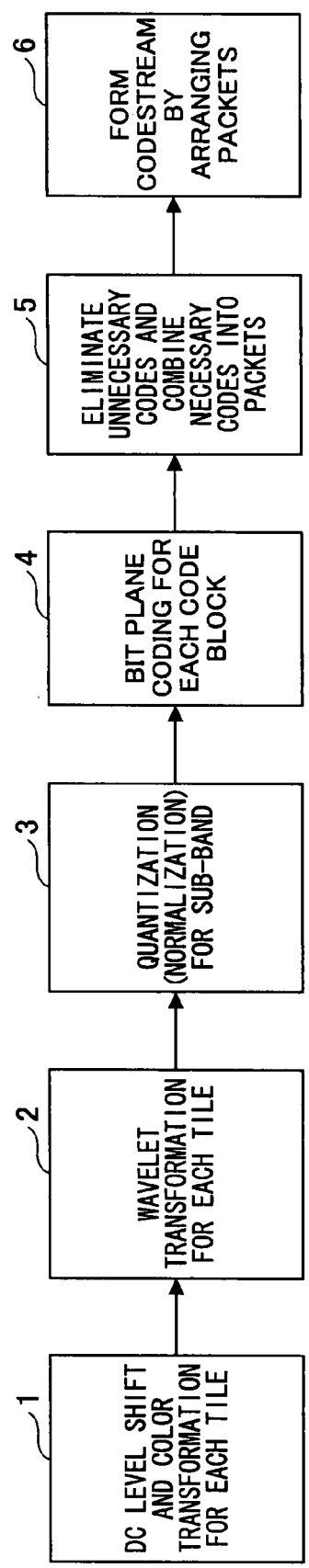
FIG. 1 is a block diagram for describing an encoding algorithm of JPEG 2000.
Figure 2:
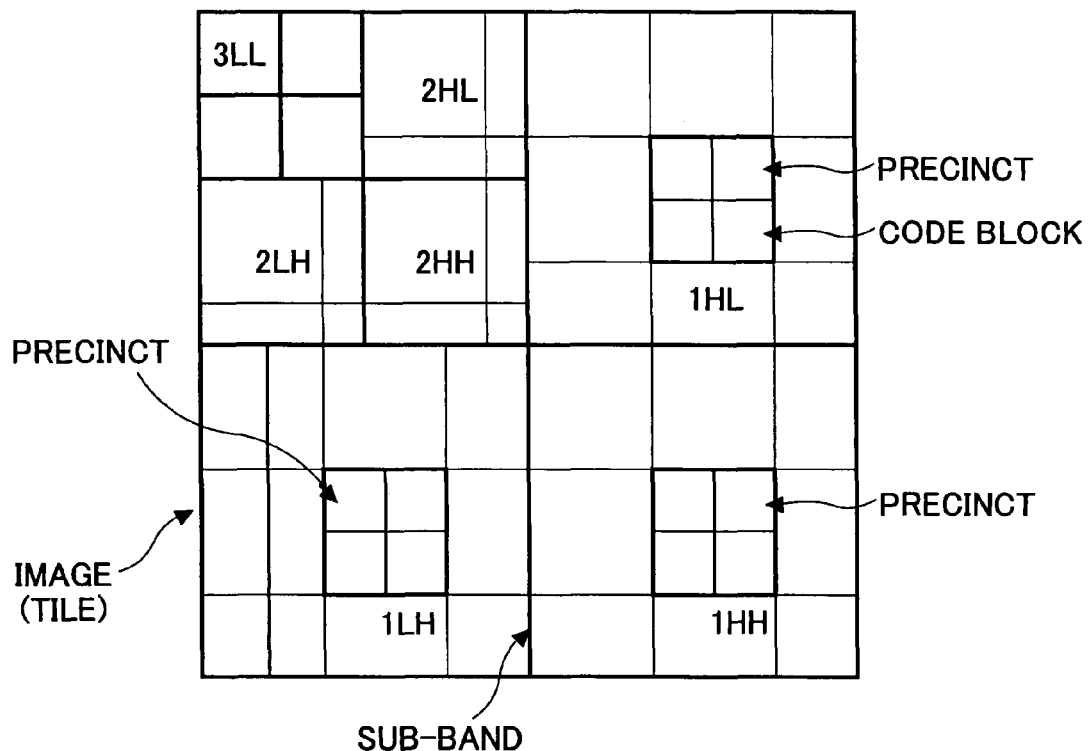
FIG. 2 is a schematic diagram for describing a relationship between an image, a tile, a sub-band, a precinct, and a code block.
Figure 4A:
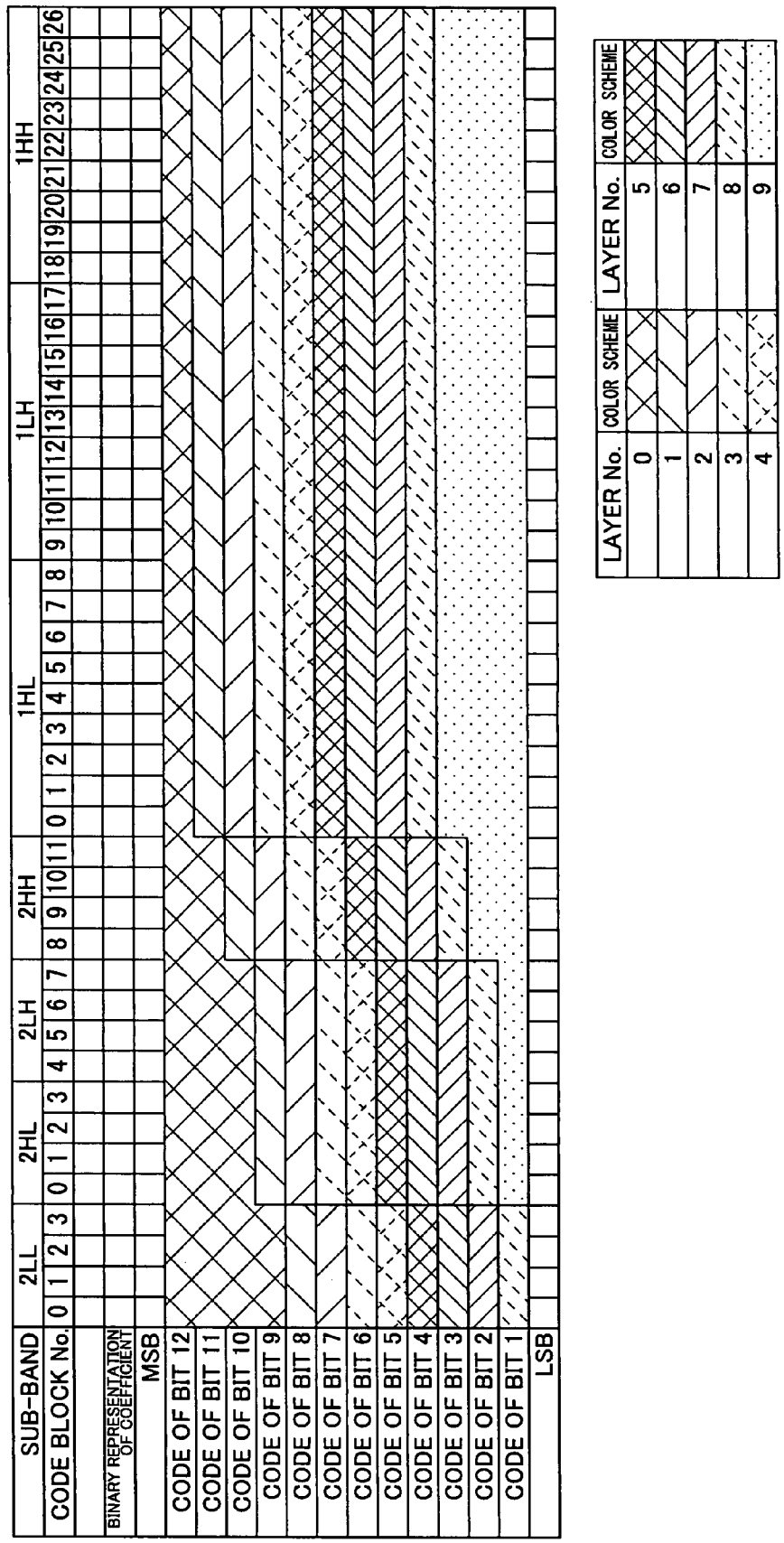
FIGS. 4A and 4B are schematic diagrams showing an example of layer division.
Figure 4B:
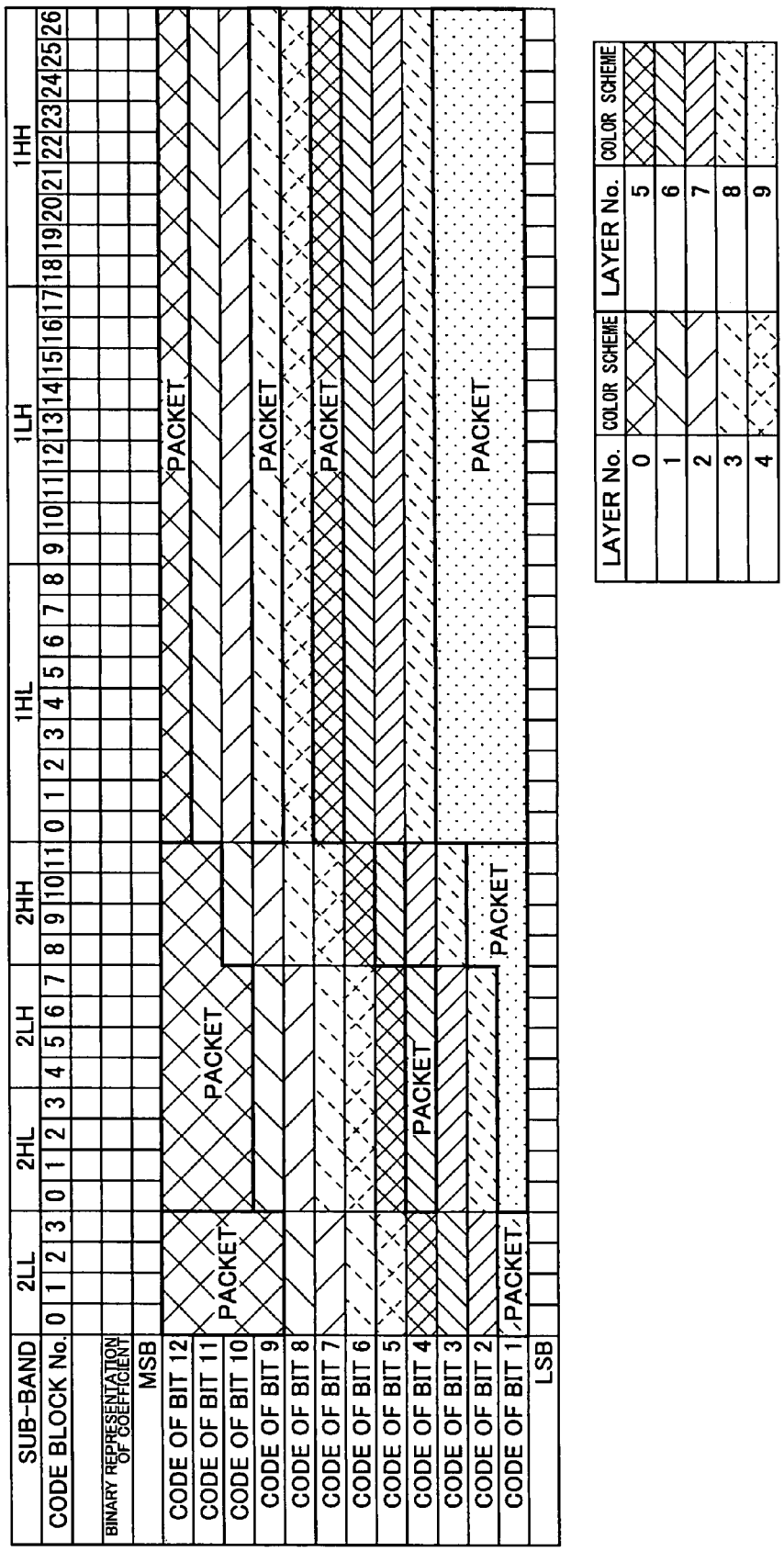
Figure 6:
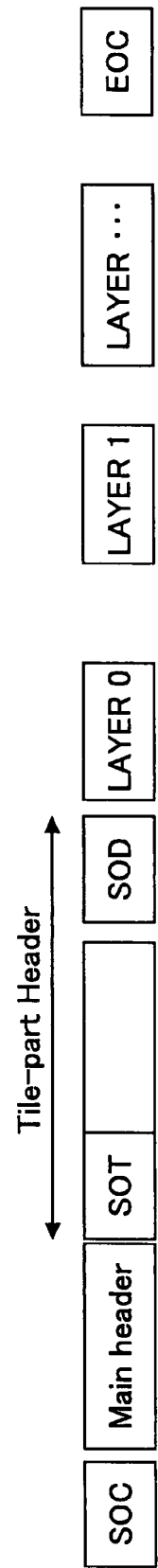
FIG. 6 is a schematic diagram showing a layer progressive codestream.
Figure 8:
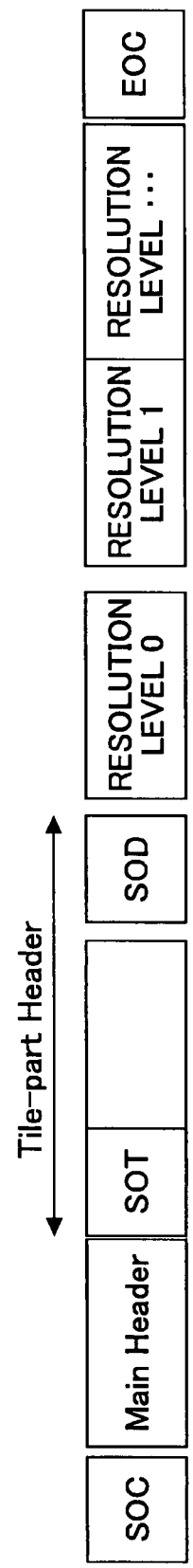
FIG. 8 is a schematic diagram showing a resolution progressive codestream.
Figures 12, 13:
FIG. 12 is a schematic diagram showing an exemplary configuration of a TLM marker segment.
FIG. 13 is a table showing the content of a TLM marker segment.

Then, in the PC 100, the RAM 111 reads out image data from the hard disk 112 and the CPU 110 performs an encoding process on the image data (i.e. the processes illustrated in Blocks 1-5 of FIG. 1), to thereby generate JPEG 2000 packets in the RAM 111 (Step S102).

Then, in the PC 100, the CPU 110 arranges the packets according to the selected extended progression order (Step S103). Then, the packet arrangement is added to other data, for example, a main header including the COM marker segment, to thereby generate a final JPEG 2000 codestream (technically, a JPEG 2000-like codestream) in the RAM 111 (Step S104). The Steps S103 and S104 correspond to the process illustrated in Block 6 of FIG. 1. Then, the generated JPEG 2000 codestream is stored in a file in the form of a JP2 format, to thereby generate a JP2 file format including the JPEG 2000 codestream in the RAM 111 (Step S105). Then, the JP2 file format is transferred to the hard disk apparatus 112 and stored in the hard disk apparatus 112 (Step S106). It is to be noted that the generated JPEG 2000 codestream may be stored in the hard disk apparatus 112 without being in a file with the JP2 format.

In the first embodiment of the present invention, the JPEG 2000 codestream generating operation shown in FIG. 36 may be executed by a program recorded in a computer-readable recording medium. The program may be read out, for example, by a code processing apparatus including the above-described computer (PC) 100, 101.

Furthermore, according to a modified example of the above-described embodiment of the present invention, the byte data shown in FIG. 27 corresponding to the selected extended progression order may alternatively be recorded in a Sgcod of a COD marker segment instead of the COM marker segment of the main header.

Second Embodiment

Figure 37:
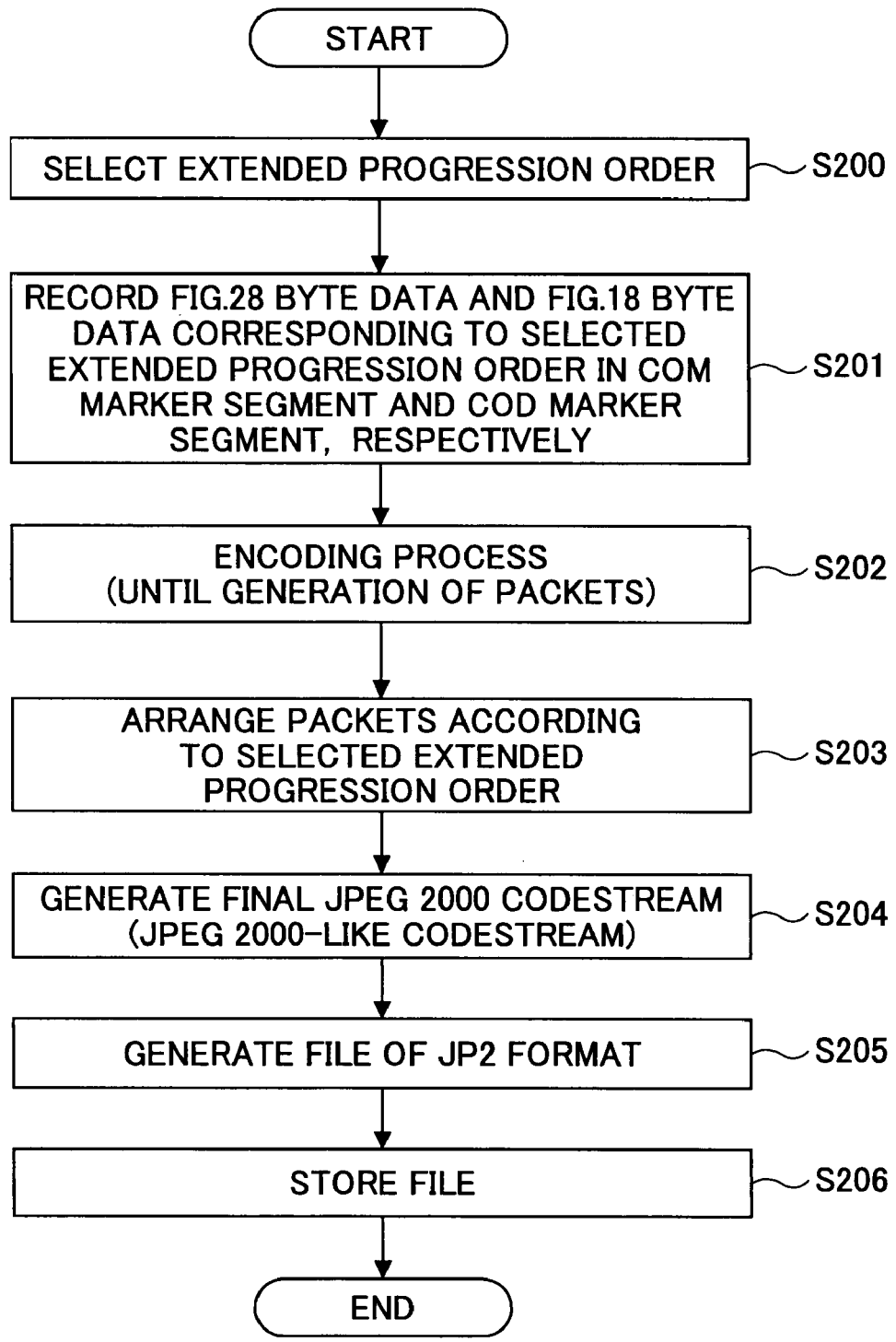
FIG. 37 is a flowchart showing a code processing method according to the second embodiment of the present invention.

FIG. 37 is a flowchart for describing a code processing method (codestream generating operation) according to a second embodiment of the present invention. Since Steps S200, S202-S206 of FIG. 37 are the same as Steps S100, S102-S106 of FIG. 36, description of Steps S200, S202-S206 is omitted.

Although Step S201 is a step corresponding to Step S101 of FIG. 36, Step S201 is partly different from S101. That is, with the PC 100 according to the second embodiment of the present invention, in addition to generating byte data (shown in FIG. 28) corresponding to the extended progression order, additional byte data (shown in FIG. 18) corresponding to the order of R, L, C, P of the extended progression order (i.e. ordinary progression order) are also generated as data for identifying the extended progression order selected in Step S200. The former byte data are recorded in the COM marker segment and the latter byte data are recorded in the COD marker segment. More specifically, the COM marker segment having the former byte data recorded therein and the COD marker segment having the latter byte data recorded therein are recorded in a main header area of a JPEG 2000 format area provided in the RAM 111. Likewise to the first embodiment of the present invention, the JPEG 2000 codestream generated in Step S204 may be stored in the hard disk apparatus 112 without being in a file with the JP2 format.

Furthermore, according to a modified example of the above-described embodiment of the present invention, Step S201 may be omitted. In addition, the byte data shown in FIG. 27 corresponding to the selected extended progression order may alternatively be recorded in an outside database, for example, after Step S206. The byte data may be recorded in the outside database in correspondence with the file name of the byte data or an identifier of the codestream included in the generated file (for example, see FIG. 29).

In the second embodiment of the present invention, the JPEG 2000 codestream generating operation shown in FIG. 37 may be executed by a program recorded in a computer-readable recording medium. The program may be read out, for example, by a code processing apparatus including the above-described computer (PC) 100, 101.

Third Embodiment

Figure 38:
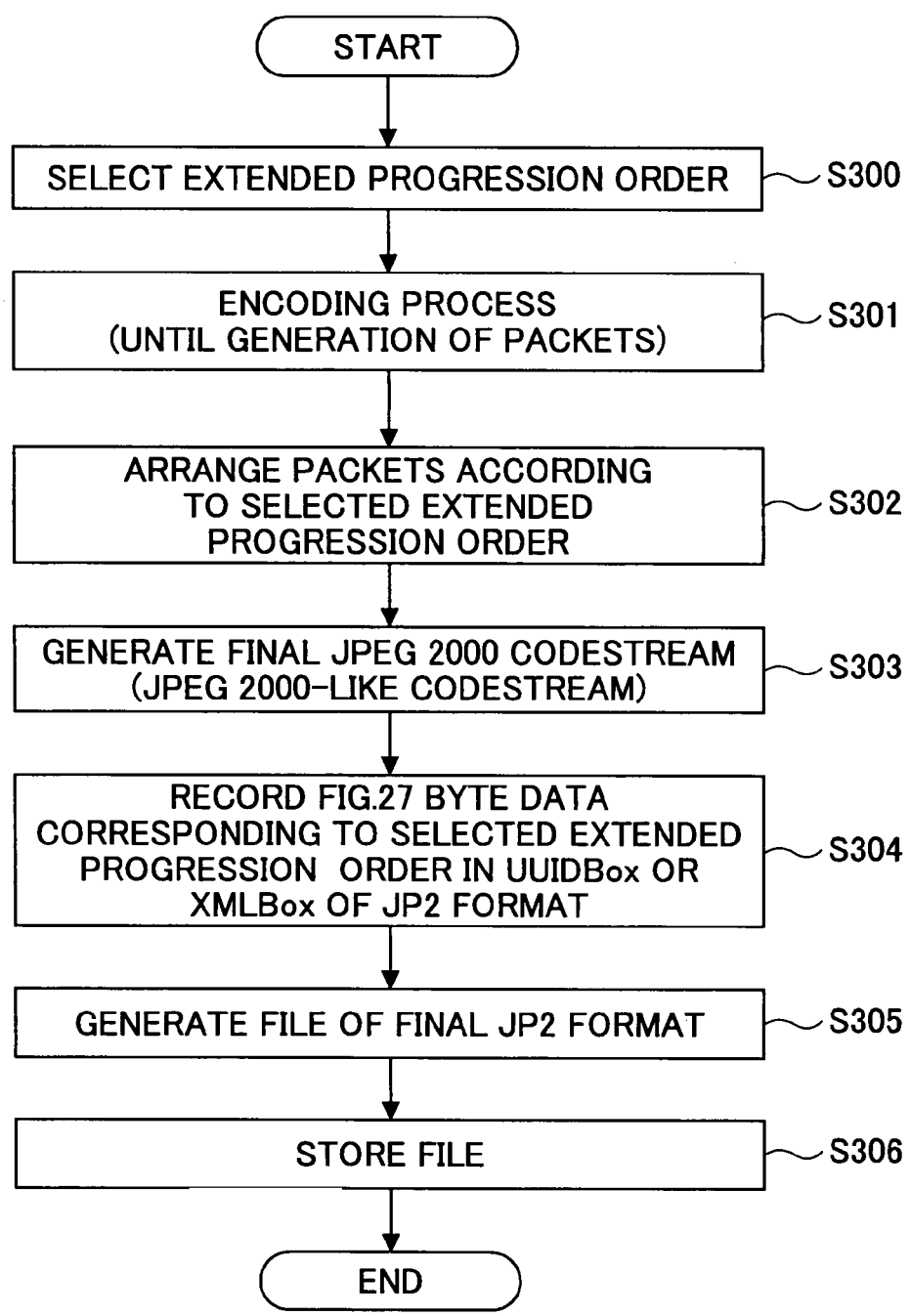
FIG. 38 is a flowchart showing a code processing method according to the third embodiment of the present invention.

FIG. 38 is a flowchart for describing a code processing method (codestream generating operation) according to a third embodiment of the present invention. Since Steps S300, S301, S302, S303, S305, and S306 of FIG. 38 are the same as Steps S100, S102, S103, S104, S105, and S106 of FIG. 36, description of Steps S300, S301, S302, S303, S305, and S306 is omitted.

With the PC 100 according to the third embodiment of the present invention, byte data (shown in FIG. 27) corresponding to the extended progression order are recorded in a data field of a DBox of a UUIDbox of a JP2 file format or recorded in a DBox of an XMLBox of a JP2 file format in the form of tag data, to thereby serve as data for identifying the extended progression order selected in Step S300. More specifically, the byte data (shown in FIG. 27) corresponding to the extended progression order are recorded in the above-described Box areas in the JP2 file format in the RAM 111.

In the third embodiment of the present invention, the JPEG 2000 codestream generating operation shown in FIG. 38 may be executed by a program recorded in a computer-readable recording medium. The program may be read out, for example, by a code processing apparatus including the above-described computer (PC) 100, 101.

Fourth Embodiment

Figure 39:
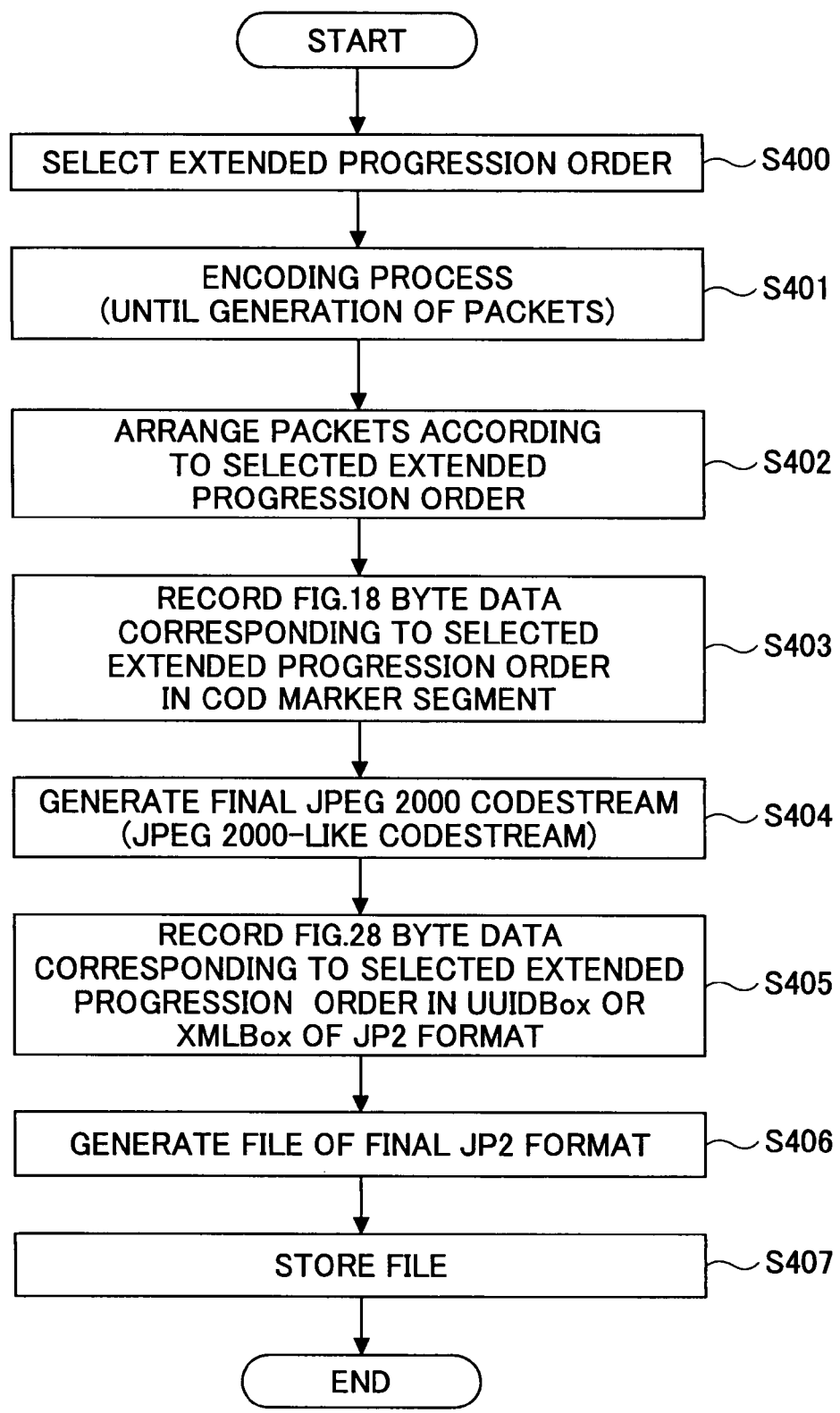
FIG. 39 is a flowchart showing a code processing method according to the fourth embodiment of the present invention.

FIG. 39 is a flowchart for describing a code processing method (codestream generating operation) according to a fourth embodiment of the present invention. Since Steps S400, S401, S402, S404, S406, and S407 of FIG. 39 are the same as Steps S100, S102, S103, S104, S105, and S106 of FIG. 36, description of Steps S400, S401, S402, S404, S406, and S407 is omitted.

In the fourth embodiment of the present invention, byte data (shown in FIG. 18) corresponding to the order of R, L, C, P of the extended progression order are recorded in a Sgcod of a COD marker segment in the main header of the JPEG 2000 codestream format (Step S403), to thereby serve as data for identifying the extended progression order selected in Step S400. In addition, byte data (shown in FIG. 28) corresponding to the extended progression order are recorded in a DBox of a UUIDbox of a JP2 file format or recorded in a DBox of an XMLBox of a JP2 file format (Step S405).

In the fourth embodiment of the present invention, the JPEG 2000 codestream generating operation shown in FIG. 39 may be executed by a program recorded in a computer-readable recording medium. The program may be read out, for example, by a code processing apparatus including the above-described computer (PC) 100, 101.

Fifth Embodiment

Figure 40:
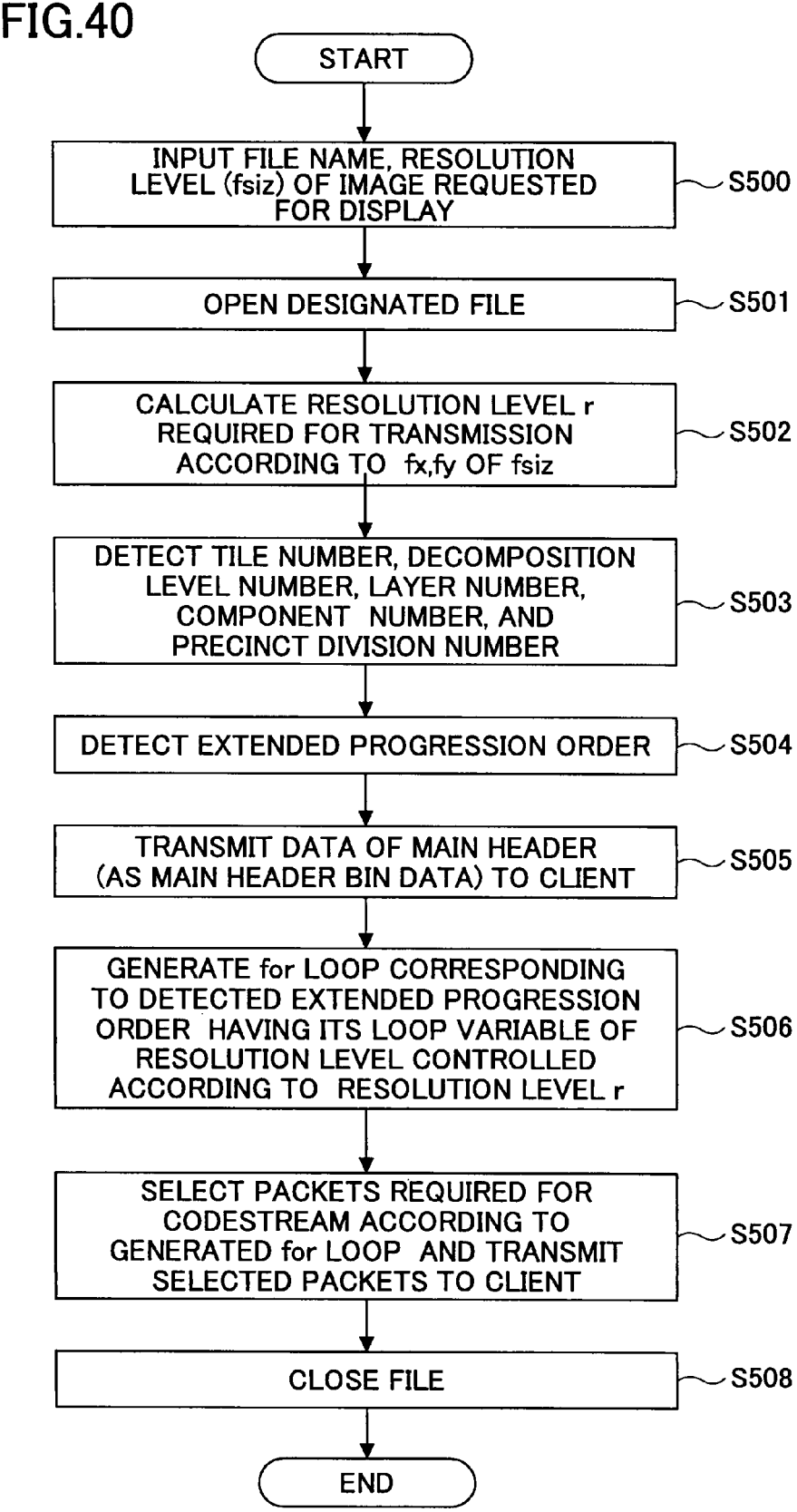
FIG. 40 is a flowchart showing a code processing method according to the fifth embodiment of the present invention.

FIG. 40 is a flowchart for describing a code processing method (codestream generating operation) according to according to a fifth embodiment of the present invention. In the fifth embodiment of the present invention, the PC 100 operates as a JPIP server and the PC 101 operates as a JPIP client. The steps illustrated in the flowchart of FIG. 40 are executed in the PC 100 operating as the JPIP server.

The file to be processed according to the fifth embodiment of the present invention is the JP2 file format generated by one of the code processing apparatuses described in the first-fourth embodiments (including modified examples) of the present invention. The JP2 file format is stored in the hard disk apparatus 112 of the PC 100 (JPIP server). The JP2 file format may also be stored, for example, in an outside hard disk apparatus managed by the JPIP server. In this example, the manner in which the data for identifying the selected extended progression order are stored may be known beforehand by the PC 100.

In a JPIP system, besides transmitting data indicating a file name designating the image to be displayed, the client also transmits data indicating designated resolution and designated displaying window (window size) to the server. For example, resolution can be designated by using a parameter referred to as "fsiz". The fsiz parameter includes a data item "fx" for indicating size in the x direction and a data item "fy" for indicating size in the y direction. Furthermore, window size can be designated by using a parameter referred to as "rsiz". The fsiz parameter and rsiz parameter can be expressed as follows.

fsiz="fsiz" "="size in x direction "," size in y direction ["," "closest"]

rsiz="rsiz" "=" window size in x direction "," window size in y direction

In this example, it is supposed that the image size of the resolution level request by the client matches the window size for displaying the image. Furthermore, in this example, each side (vertical, horizontal) of the tile of the codestream stored in the file is a power of 2 in size.

With reference to the flowchart shown in FIG. 40, the PC (JPIP server) 100 receives a file name and a resolution level (expressed as "fsiz") for an image requested to be displayed from the PC (JPIP client) 101 (Step S500).

The PC 100 opens a file corresponding to the file name designated by the client 101 (Step S501) and calculates the resolution level r required for transmitting the image data of the requested image according to the x direction size (fx) and the y direction size (fy) indicated in the fsiz (Step S502). In this example, it is required to transmit packets of resolution level 0 to resolution level r. Step S502 is described in further detail below.

Then, the PC 100 detects the conditions for encoding the codestream of the image data (e.g., tile number, decomposition level number, layer number, component number, precinct division number) from the SIZ marker segment or the COD marker segment in the main header of the codestream in the designated file (Step S503).

Then, the PC 100 detects the order of the packet arrangement in the codestream (in this case, extended progression order including a tile characteristic as one of its progression characteristics) (Step S504). This detection is conducted by referring to the codestream, the file including the codestream and/or data for identifying the extended progression order stored, for example, in an outside database (as described in the first-fourth embodiments of the present invention). In a case where the extended progression order to be used for the packet arrangement of the codestream is known beforehand by the PC 100, Step S504 may be omitted.

Then, the PC 100 transmits a main header data bin including data regarding the main header of the codestream to the PC (client) 101 (Step S505).

Then, in correspondence with the detected extended progression order, a for loop having its loop variable of the resolution level controlled according to resolution level r is generated (Step S506). By repeating the for loop, required packets are selected and transmitted to the PC (client) 101 (Step S507). Then, the designated file is closed (Step S508). Thereby, the execution of the series of processes (steps) is completed.

For example, in a case where the packets in a codestream are arranged according to an extended progression order of RTLCP under the conditions of tile number=2, resolution level number=3, layer number=2, component number=3, and precinct number=1 (maximum precinct), the for loop is configured as follows.

```
for (0 ≦ resolution level ≦ r) {
  for (0 ≦ tile number ≦ 1) {
    for (0 ≦ layer number ≦ 1) {
      for (0 ≦ component number ≦ 2) {
        for (precinct number = 0) {
        }
      }
    }
  }
}
```

In this case, by executing the following loop in Step S507, data regarding the starting position and the length of all of the packets to be transmitted are obtained, then, the packets to be transmitted are selected based on the obtained data, and then the selected packets are transmitted.

```
for (0 ≦ resolution level ≦ r) {
  for (0 ≦ tile number ≦ 1) {
    for (0 ≦ layer number ≦ 1) {
      for (0 ≦ component number ≦ 2) {
        for (precinct number = 0) {
          detect packet length by decoding packet header and maintain
          starting position and packet length of packet
        }
      }
    }
  }
}
```

Alternatively, in this case, the following loop may be executed in Step S507.

```
for (0 ≦ resolution level ≦ r) {
  for (0 ≦ tile number ≦ 1) {
    for (0 ≦ layer number ≦ 1) {
      for (0 ≦ component number ≦ 2) {
        for (precinct number = 0) {
          detect packet length by decoding packet headers and select and
          transmit packet based on detected packet length
        }
      }
    }
  }
}
```

In using either loop, the number of packets to be detected (scanned) can be controlled and necessary packets can be selected efficiently even where the codestream is composed of plural tiles.

There are two types of transmission for the selected packets. The first transmission type is transmitting the selected packets in the form of tile parts by adding an SOT marker segment at the front of each selected packet or at the resolution level boundaries or the component boundaries of the selected packet arrangement. In this case, the tile parts may be divided according to necessity and have added a predetermined message header so that the tile parts serve as a JPT message. In other words, the first transmission type is a JPT stream transmission type.

The second transmission type is transmitting the selected packets not in the form of packets but in the form of precincts. In this case, each precinct is divided according to necessity and has added a predetermined message header so that the precincts serve as a JPP (JPIP Precinct) message. In other words, the second transmission type is a JPP stream transmission type. It is to be noted that JPP is a method of transmitting packets according to JPIP.

FIG. 41 is a flowchart for describing the processes in Step S502 of FIG. 40. First, fx and fy of fsiz are obtained (Step S600). Then, the horizontal size (X siz) and the vertical size (Y siz) of the original image are detected from the SIZ marker segment in the main header of the codestream in the designated file (Step S601). Then, the decomposition level number d is detected from the COD marker segment (Step S602). Then, it is determined whether the conditions of "fx is no greater than the value of Xsiz divided by d power of 2" and "fy is no greater than the value of Ysiz divided by d power of 2" (Step S603). If the conditions are satisfied (Yes in Step S603), the resolution level is set to r=0 (Step S604). If the conditions are not satisfied (No in Step S603), the resolution level r is obtained by performing the calculation below (Step S605).

$$r = d - \min[\log 2(Xsiz/fx), \log 2(Ysiz/fy)] + 1$$

In the above calculation, "log 2 ( )" is a logarithm having 2 as the base, "min[a,b]" is a function providing the lesser value among a and b.

Although the above-embodiments of the present invention are described by using an exemplary case where the image size of the resolution level requested by the client matches with the displaying window size, the packets or tile parts of the tiles (of the requested resolution level) included in the displaying window are transmitted in a case where the displaying window size is smaller than the image size of the requested resolution level.

Furthermore, although the above-embodiments of the present invention are described by using an exemplary case of processing a JP2 format file, the process may also be performed on a codestream (data not in the form of a file).

In the fifth embodiment of the present invention, the operation shown in FIG. 40 may be executed by a program recorded in a computer-readable recording medium. The program may be read out, for example, by a code processing apparatus including the above-described computer (PC) 100, 101.

Furthermore, although the above-embodiments of the present invention are described by using an exemplary case of transmitting selected packets, a codestream that only includes the selected packets or a file including such codestream may be generated and processed.

With the above-described embodiments of the present invention, a particular packet(s) can be easily and efficiently selected and accessed, to thereby allow a JPIP server, for example, to satisfactorily generate a codestream or a file including the codestream. This advantage is described in further detail below with reference to FIGS. 30-32.

Figures 29, 30:
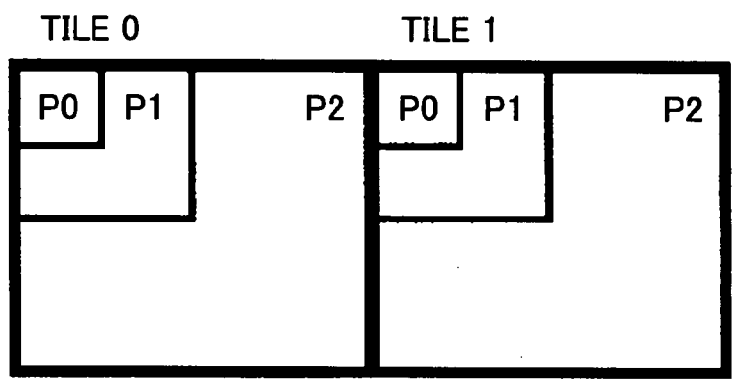
FIG. 29 is a table for describing a database having extended progression orders recording in correspondence with files.
FIG. 30 is a schematic diagram for describing a code of a monochrome image composed of two tiles.

FIG. 30 shows a schematic diagram for describing a codestream for a monochrome image having two tiles where each tile has a maximum resolution level=2, a layer number=1, and a precinct number=1 (maximum precinct). In a case where the progression order of the codestream is an ordinary progression order of RLCP (substantially equivalent to R progression since L=C=P=1), the packets of the codestream are arranged in an order shown in FIG. 31. It is to be noted that an SOT marker segment is provided at the start of the packets of each tile. In the codestream shown in FIG. 31 where, for example, the packets of all tiles corresponding to resolution level 0 are selected, it becomes necessary to either scan at least from the first packet (starting packet) to the fourth packet or detect the position and length of all packets beforehand.

However, with the code processing apparatus according to an embodiment of the present invention, in a case where, for example, an extended progression order RTLCP is selected, the packets of the codestream are arranged from "resolution level order to tile order" as shown in FIG. 32. Therefore, the packets of all tiles corresponding to resolution level 0 can be efficiently selected by scanning only two packets from the beginning of the codestream (first and second packets).

In a case of the codestream according to the RTLCP extended progression order, although the SOT marker segments for tiles 0 and 1 are consecutively provided at the beginning of the packets (see upper part of FIG. 32), the SOT marker segment for only tile 0 may alternatively be provided at the beginning of the packets (see lower part of FIG. 32). The reasons for such alternative are described below. For one reason, normally, in a case where the encoding conditions of each tile are the same, the second or latter SOT marker segment includes a tile number, a tile part number, and a tile part length; however, the tile number can be detected during decoding of the codestream or packet selection by referring to the counter of the loop variable of the for loop of the extended progression order. Furthermore, the tile part number is unnecessary for decoding or selecting of packets. Moreover, the packet length can be obtained by referring to, for example, the packet header or the PLT marker segment.

As for further reference, FIGS. 33 and 34 show packet arrangement of a codestream, respectively, in a case where the tile number=2, resolution level number=3, layer number=2, component number=3, and precinct number=1 (maximum precinct). More specifically, FIG. 33 shows an example of a packet arrangement of a codestream according to a TLRCP progression order, and FIG. 34 shows an example of a packet arrangement of a codestream according to a LTRCP progression order.

Further, the present invention is not limited to these embodiments, but variations and modifications may be made without departing from the scope of the present invention.

What is claimed is:

1. A code processing apparatus for generating a file including a JPEG 2000 codestream or a JPEG 2000 family format including the JPEG 2000 codestream, the code processing apparatus comprising:
    a memory to store the JPEG codestream; and
    a processing device coupled with the memory to execute a packet arranging unit, the packet arranging unit to arrange the order of a plurality of packets included in the JPEG 2000 codestream according to an extended progression order selected from a group of extended progression orders including "xTxxx", "xxTxx", "xxxTx", and "xxxxT",
    wherein each "x" in the extended progression orders represents one of a resolution level characteristic, a layer characteristic, a component characteristic, and a precinct characteristic,
    wherein the leftmost "x" of each extended progression order corresponds to an outermost characteristic of the extended progression order, and
    wherein "T" represents a tile characteristic.

2. The code processing apparatus as claimed in claim 1, further comprising:
    a recording unit to record data identifying the selected extended progression order in a COM marker segment of the JPEG 2000 codestream.

3. The code processing apparatus as claimed in claim 1, further comprising:
    a recording unit to record data identifying the selected extended progression order in a COD marker segment of the JPEG 2000 codestream.

4. The code processing apparatus as claimed in claim 1, further comprising:
    a recording unit to record a first data item identifying the selected extended progression order in a COM marker segment of the JPEG codestream and a second data item identifying the selected extended progression order in a COD marker segment of the JPEG codestream.

5. A code processing method for generating a file including a JPEG 2000 codestream or a JPEG 2000 family format including the JPEG 2000 codestream, the code processing method comprising:
    arranging an order of a plurality of packets included in the JPEG 2000 codestream according to an extended progression order selected from a group of extended progression orders including "xTxxx", "xxTxx", "xxxTx", and "xxxxT";
    wherein each "x" in the extended progression orders represents one of a resolution level characteristic, a layer characteristic, a component characteristic, and a precinct characteristic,
    wherein the leftmost "x" of each extended progression order corresponds to an outermost characteristic of the extended progression order, and
    wherein "T" represents a tile characteristic.

6. The code processing method as claimed in claim 5, further comprising:

recording data identifying the selected extended progression order in a COM marker segment of the JPEG 2000 codestream.

7. The code processing method as claimed in claim 5, further comprising:

recording data identifying the selected extended progression order in a COD marker segment of the JPEG 2000 codestream.

8. The code processing method as claimed in claim 5, further comprising:

recording a first data item identifying the selected extended progression order in a COM marker segment of the JPEG codestream and a second data item identifying the selected extended progression order in a COD marker segment of the JPEG codestream.

\* \* \* \* \*